US010837848B2

(12) United States Patent
Janisch et al.

(10) Patent No.: US 10,837,848 B2
(45) Date of Patent: Nov. 17, 2020

(54) ULTRA-THIN COMBINED INDUCTIVE TORQUE AND ANGLE SENSOR FOR STEERING WHEEL POSITION SENSING

(71) Applicant: Integrated Device Technology, Inc., San Jose, CA (US)

(72) Inventors: Josef Janisch, Ilz (AT); Andreas Buchinger, Waldhofen/Ybbs (AT)

(73) Assignee: Integrated Device Technology, Inc., San Jose, CA (US)

( * ) Notice: Subject to any disclaimer, the term of this patent is extended or adjusted under 35 U.S.C. 154(b) by 0 days.

(21) Appl. No.: 16/468,654

(22) PCT Filed: Dec. 11, 2017

(86) PCT No.: PCT/EP2017/082165
§ 371 (c)(1),
(2) Date: Jun. 11, 2019

(87) PCT Pub. No.: WO2018/108783
PCT Pub. Date: Jun. 21, 2018

(65) Prior Publication Data
US 2019/0331541 A1    Oct. 31, 2019

(30) Foreign Application Priority Data

Dec. 12, 2016  (EP) ..................... 16203515
Dec. 15, 2016  (EP) ..................... 16204462

(51) Int. Cl.
*G01L 3/10* (2006.01)
*B62D 1/04* (2006.01)
*G01D 5/20* (2006.01)

(52) U.S. Cl.
CPC .............. *G01L 3/105* (2013.01); *B62D 1/046* (2013.01); *G01D 5/2053* (2013.01)

(58) Field of Classification Search
CPC ........... G01L 3/105; B62D 1/046; B62D 6/10; G01D 5/2053
(Continued)

(56) References Cited

U.S. PATENT DOCUMENTS 4,853,604 A   8/1989  McMullin et al.
6,384,598 B1  5/2002  Hoein
(Continued)

FOREIGN PATENT DOCUMENTS

DE    2118722    *  11/1972
DE    2118722 A1    11/1972
(Continued)

OTHER PUBLICATIONS

International Search Report and Written Opinion dated Jul. 17, 2018 issued in corresponding PCT/EP2017/082165 (22 pages).
(Continued)

*Primary Examiner* — Octavia Hollington
(74) *Attorney, Agent, or Firm* — Haynes and Boone, LLP

(57) ABSTRACT

The invention discloses an inductive torque sensor and a combined inductive torque and angle sensor for position sensing. The object of the invention to propose a torque sensor as well as a combined torque and angle sensor which does not require a shielding of the sensor PCB and which can provide a plausibility check of the torque sensor when using only three sensors will be solved by an inductive torque sensor for detection of torque movements comprising a stationary printed circuit board (PCB) with sensing coils, a primary target and a secondary target, whereas the primary target and secondary target each comprise of different metallic patterns, whereas each target covers 50% of the sensing coils and the combined coverage of both targets varies between 50% and 100% depending on the relative position between the two targets. The objective is also solved by a
(Continued)

Figure 1:
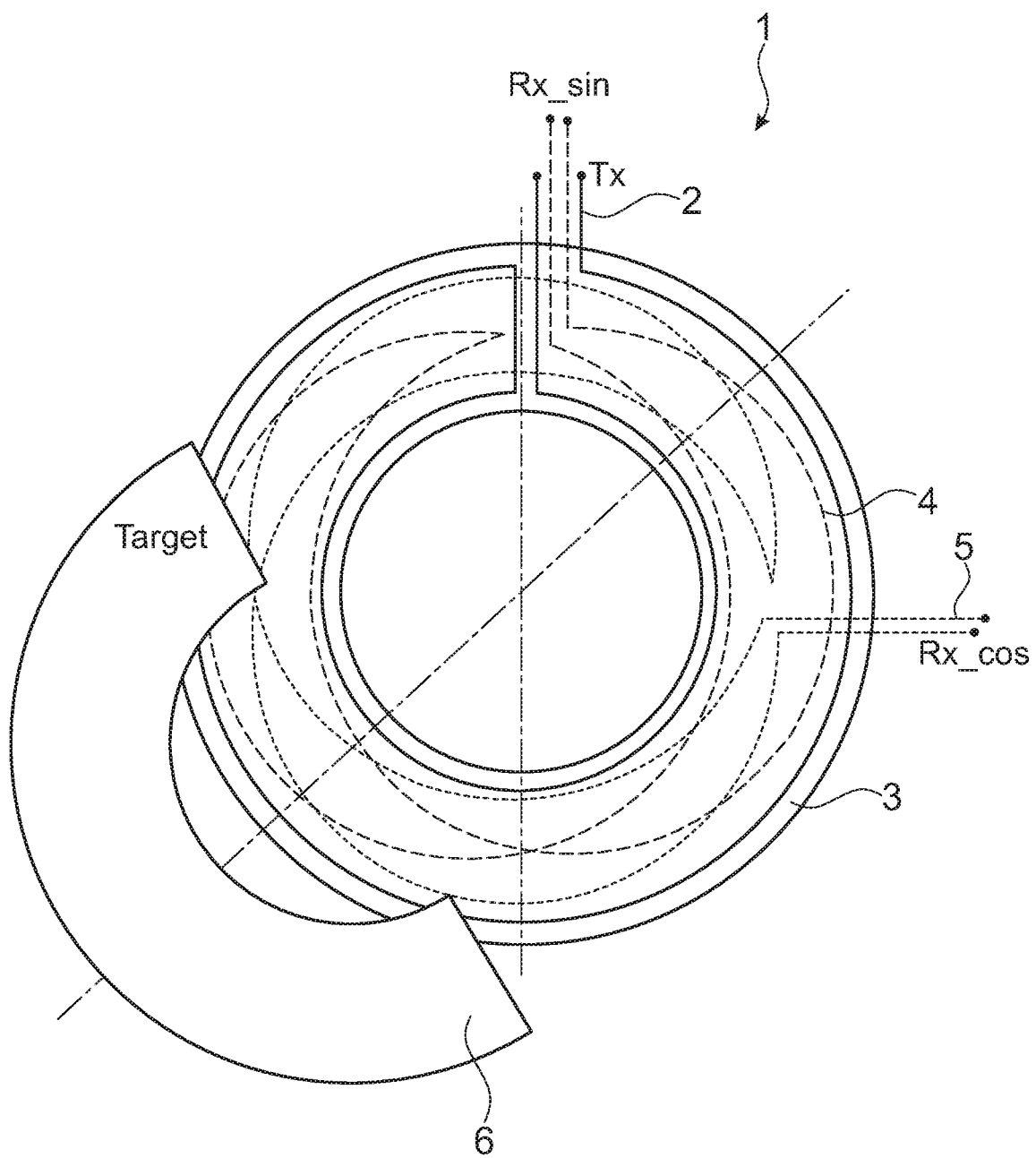

combined inductive torque and angle sensor comprising a primary target wheel, a secondary target wheel and a torsion beam, whereas the primary target wheel is centrally stacked on the torsion beam and comprises a metallic pattern for a steering angle 360° single-turn sensor and a first metallic pattern for the torque sensor, and the secondary target wheel comprises a second metallic pattern of the torque sensor.

14 Claims, 22 Drawing Sheets

(58) Field of Classification Search
USPC .................................. 73/862.09, 862.191
See application file for complete search history.

(56) References Cited

U.S. PATENT DOCUMENTS

| | | | | |
|---|---|---|---|---|
| 7,221,154 | B2* | 5/2007 | Lee | G01D 5/202 |
| | | | | 324/207.11 |
| 2002/0097042 | A1 | 7/2002 | Kawate | |
| 2007/0132449 | A1* | 6/2007 | Madni | G01D 5/04 |
| | | | | 324/207.25 |
| 2012/0119731 | A1* | 5/2012 | Deitmerg | B62D 15/0215 |
| | | | | 324/207.25 |
| 2017/0166251 | A1* | 6/2017 | Shao | G01L 3/105 |
| 2020/0018623 | A1* | 1/2020 | Jones | G01B 3/205 |

FOREIGN PATENT DOCUMENTS

| | | | |
|---|---|---|---|
| DE | 2151761 | * | 4/1973 |
| DE | 2151761 | A1 | 4/1973 |

OTHER PUBLICATIONS

Nils Labahn et al., "Kombinierter Lenkwinkel-/Lenkmomentsensor unter Einsatz diversitärer Technologien," Sensoren im Automobil V, Sensorprinzipien and deren Anwendung in automobilen Sensorsystemen, Haus der Technik Fachbuch Band 132, Herausgeber: Prof. Er.-Ing. Ulrich Brill, Essen, presented by Hella at the "Sensoren im Automobil," Congress in Germany 2014, Chapter 9, pp. 105-114.

* cited by examiner

Fig. 5
(a) 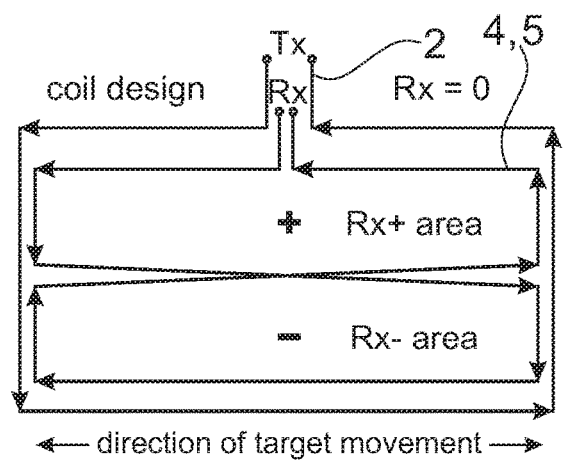
(b) 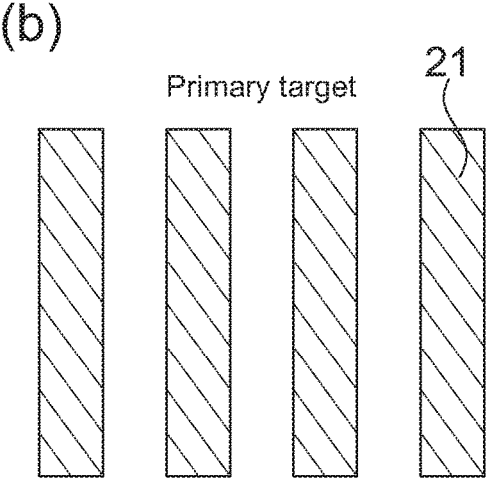
(c) 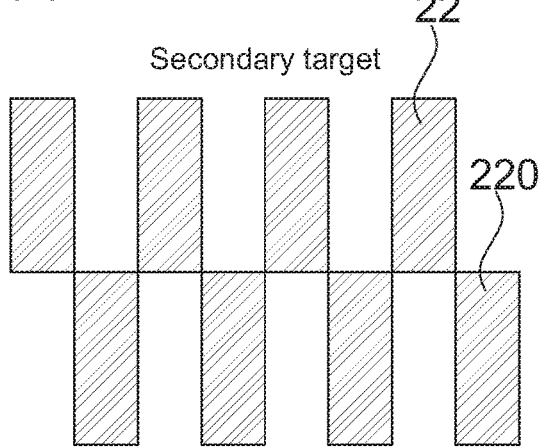
(d) 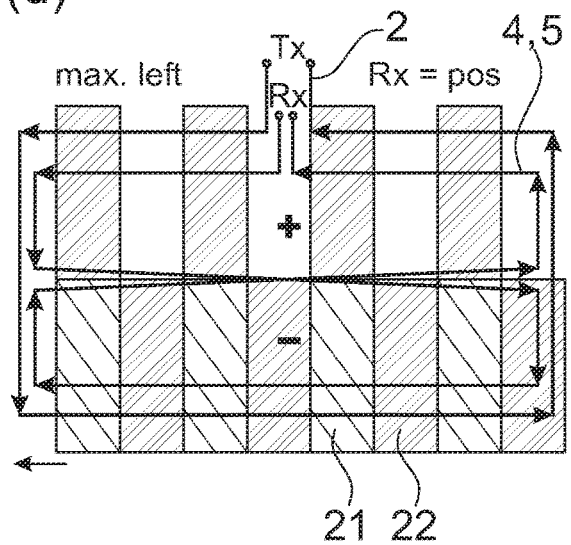
(e) 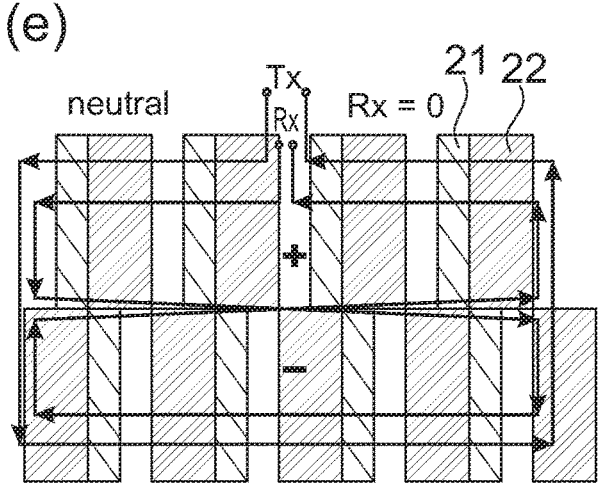
(f) 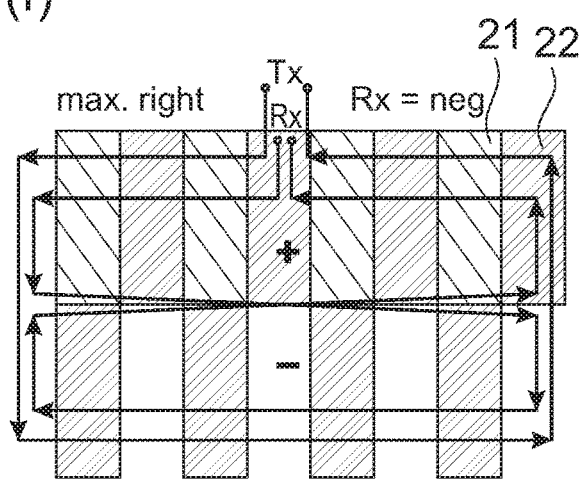

Fig. 6
(a)
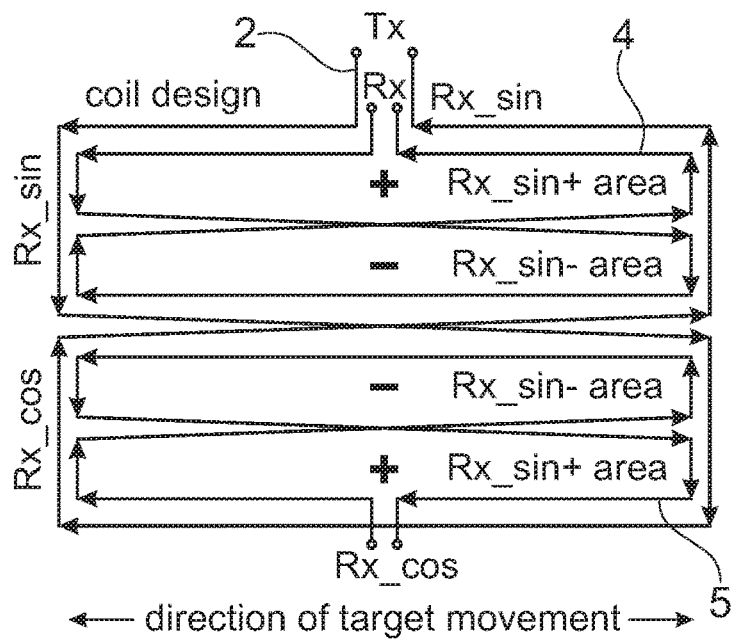
(b) Primary target
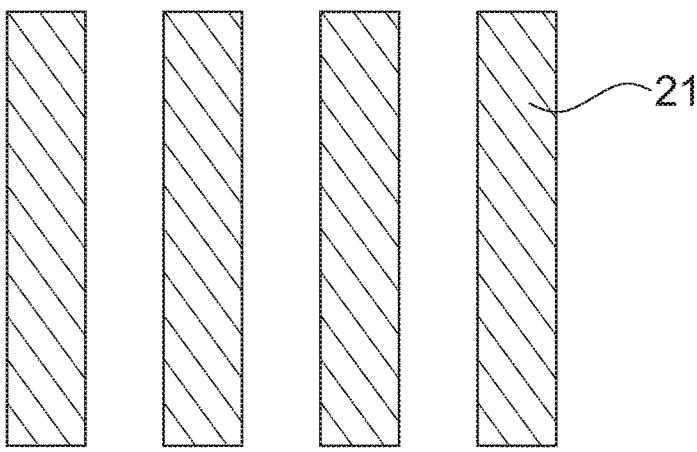
(c) Secondary target
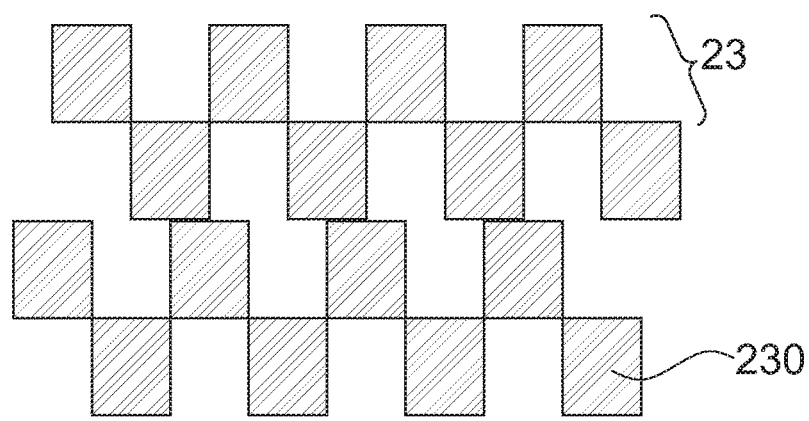

Fig. 7

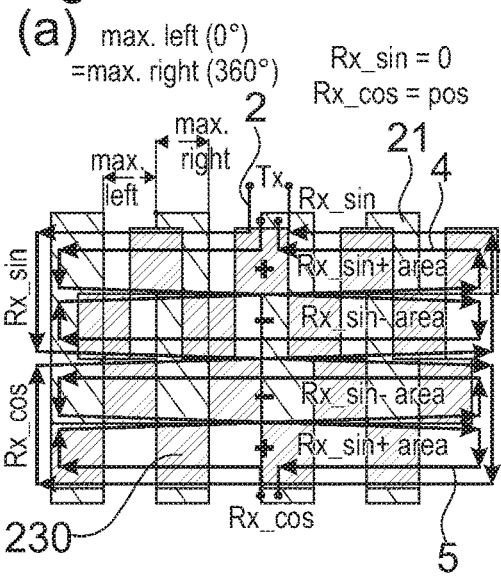
(a)

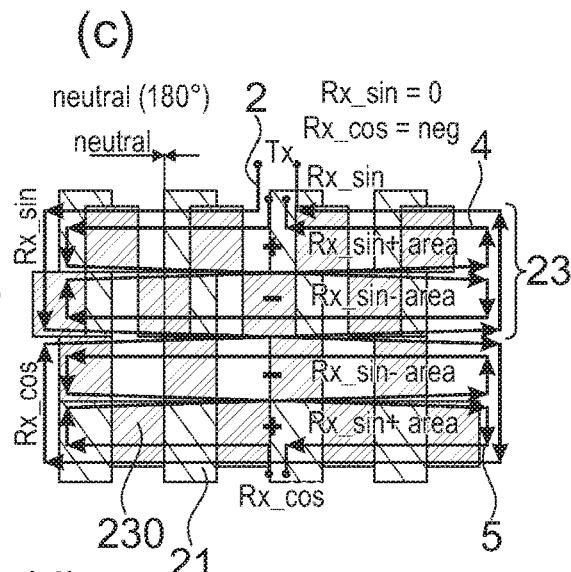
(c)

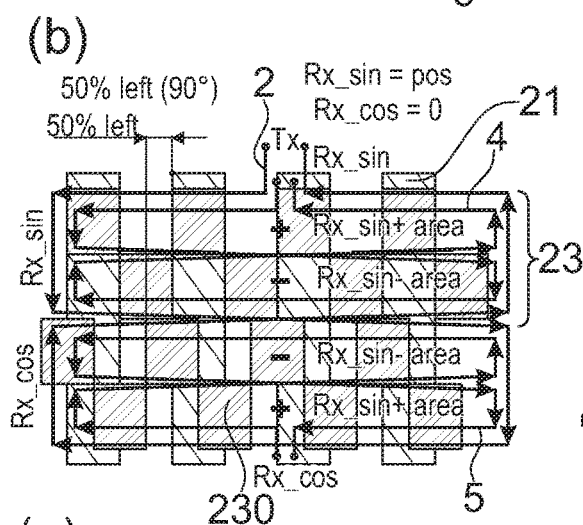
(b)

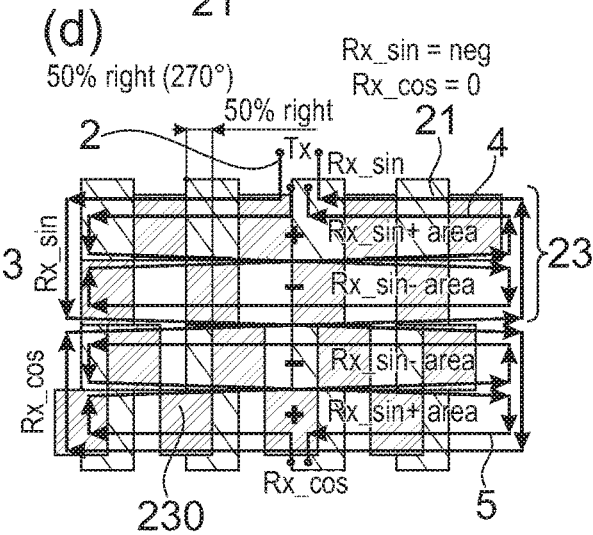
(d)

(e)

| Sine | Rx Sin + area Exposure, Vsin+ | Rx Sin + area Exposure, Vsin- | V sin (Vsin+) - (Vsin-) |
|---|---|---|---|
| Max left (1) | 25% | 25% | 0 |
| 50% left (2) | 50% | 0% | 50% in phase (positive) |
| Neutral (3) | 25% | 25% | 0 |
| 50% right (4) | 0% | 50% | 50% out of phase (negative) |
| Max right (5=1) | 25% | 25% | 0 |

| Cosine | Rx Cos + area Exposure, Vcos+ | Rx Cos - area Exposure, Vcos- | V cos (Vcos+) - (Vcos-) |
|---|---|---|---|
| Max left (1) | 50% | 0% | 50% in phase (positive) |
| 50% left (2) | 25% | 25% | 0 |
| Neutral (3) | 0% | 50% | 50% out of phase (negative) |
| 50% right (4) | 25% | 25% | 0 |
| Max right (5=1) | 50% | 0% | 50% in phase (positive) |

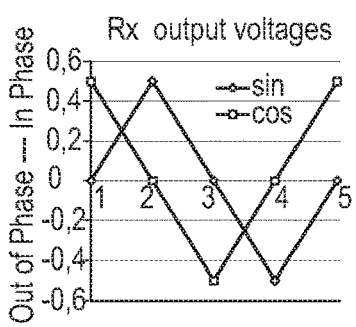

Fig. 8

| Section | sin | cos | Torque range | Ratiometric Torque calculation [0≤Tq<100%] |
|---|---|---|---|---|
| 1-2 | In phase (+) | In phase (+) | 0-25% | Tq= 25* sin / (sin+cos) |
| 2-3 | In phase (+) | Out of phase (-) | 25-50% | Tq= 25* cos / (sin-cos) + 25 |
| 3-4 | Out of phase (-) | Out of phase (-) | 50-75% | Tq= 25* sin / (sin+cos) + 50 |
| 4-5 | Out of phase (-) | In phase (+) | 75-<100% | Tq= 25* cos / (cos-sin) + 75 |

Fig. 9
(a) max. left position (0°)= max. right position (360°)
Exposure:
sin+: 34%, sin-: 34%
cos-: 18%, cos+: 50%
Vsin = 0
Vcos = max. positive
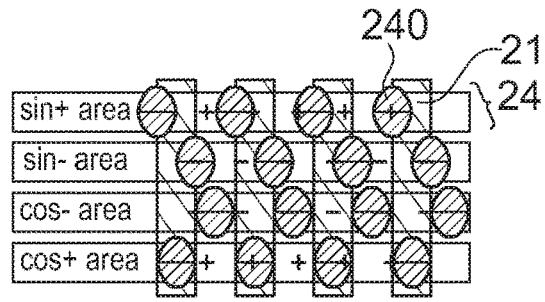
(b) 50% left position (90°):
Exposure:
sin+: 50%, sin-: 18%
cos-: 34%, cos+: 34%
Vsin = max. positive
Vcos = 0
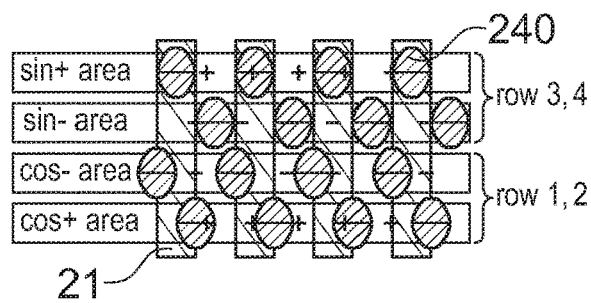
(c) neutral position (180°):
Exposure:
sin+: 34%, sin-: 34%
cos-: 50%, cos+: 18%
Vsin = 0
Vcos = max. negative
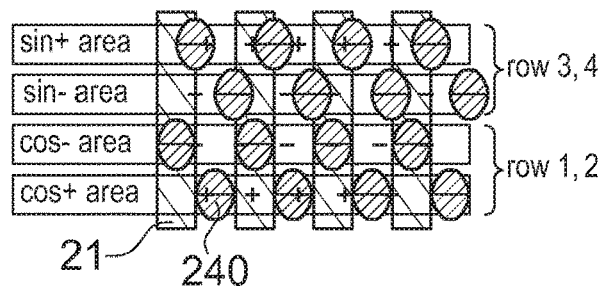
(d) 50% right position (270°):
Exposure:
sin+: 18%, sin-: 50%
cos-: 34%, cos+: 34%
Vsin = max. negative
Vcos = 0
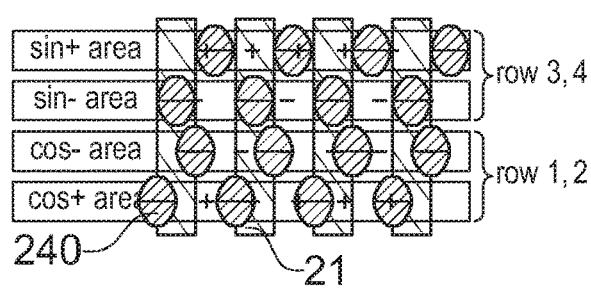
(e)
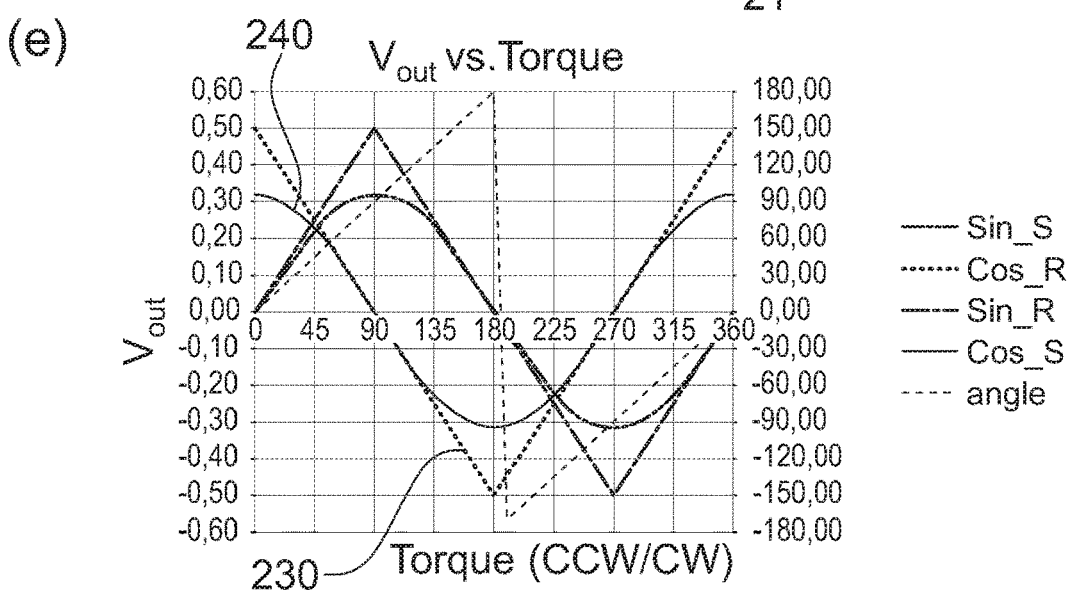

Figure 13:
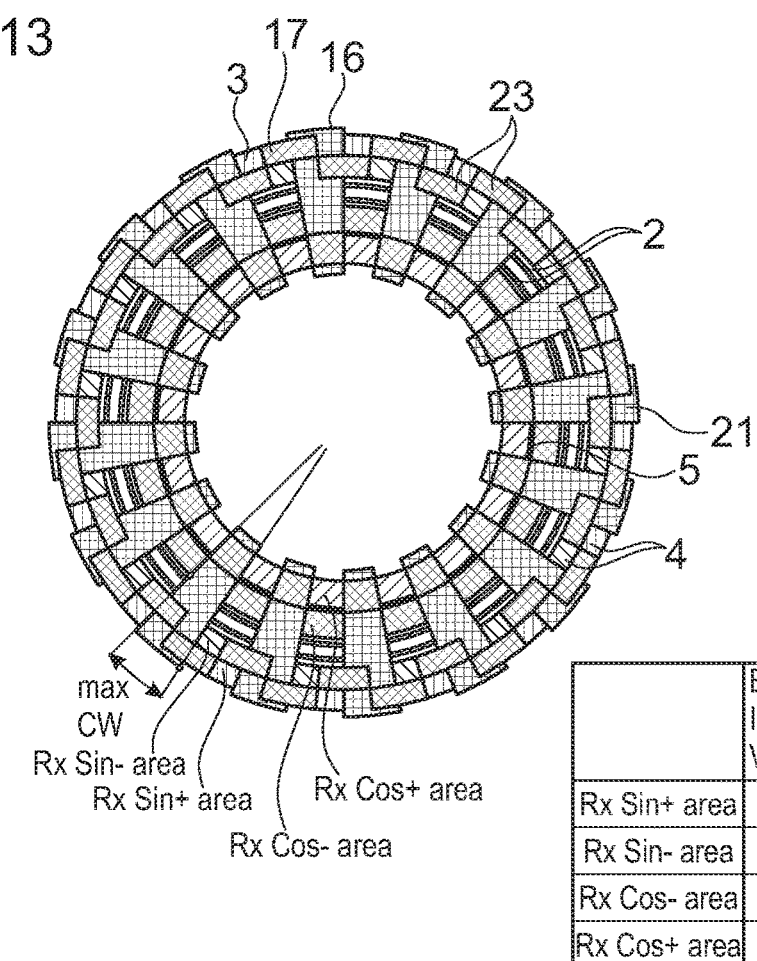

Fig. 13
(a)
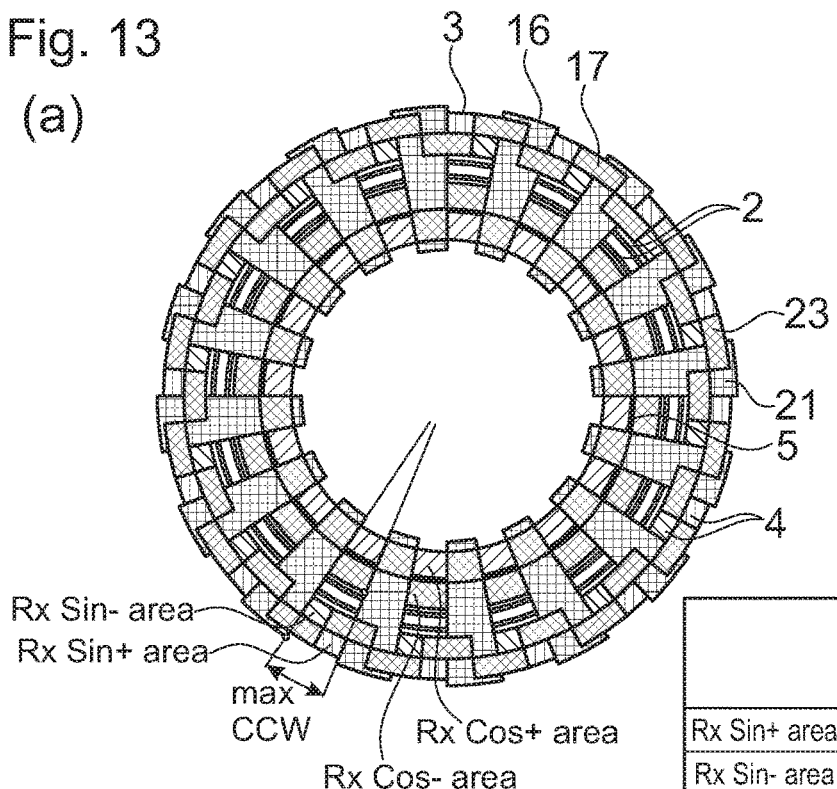
Rx Sin- area
Rx Sin+ area
max CCW
Rx Cos+ area
Rx Cos- area
| | Exposure, Induced Voltage | Combine Voltage (V+)-(V-) |
|---|---|---|
| Rx Sin+ area | 25% | Vsin = 0 |
| Rx Sin- area | 25% | |
| Rx Cos- area | 0% | Vcos = 50% pos |
| Rx Cos+ area | 50% | |
(b)
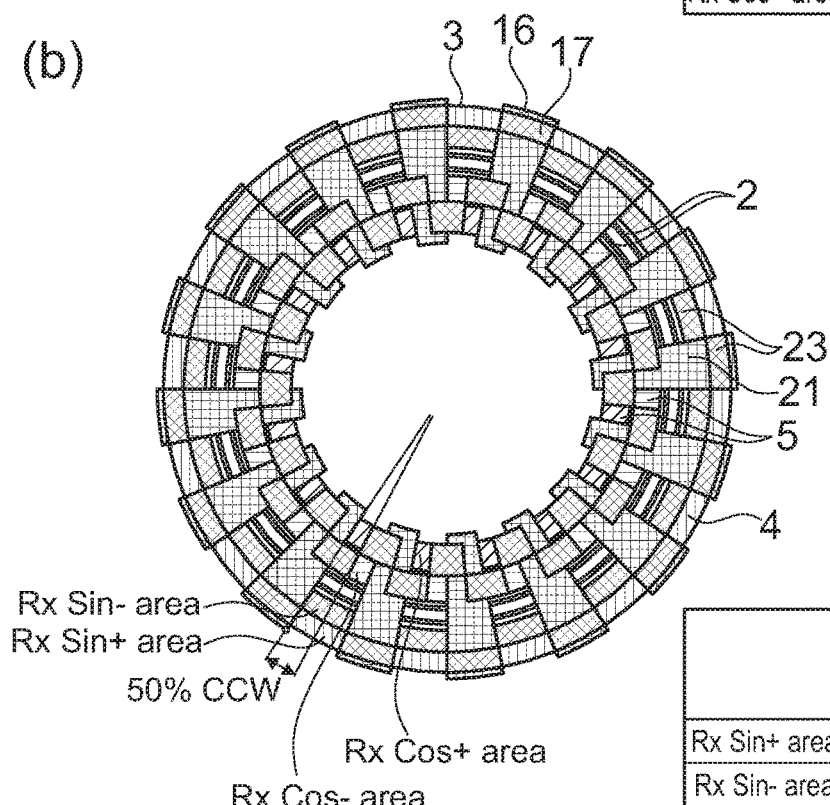
Rx Sin- area
Rx Sin+ area
50% CCW
Rx Cos+ area
Rx Cos- area
| | Exposure, Induced Voltage | Combine Voltage (V+)-(V-) |
|---|---|---|
| Rx Sin+ area | 50% | Vsin = 50% pos |
| Rx Sin- area | 0% | |
| Rx Cos- area | 25% | Vcos = 0 |
| Rx Cos+ area | 25% | |

Fig. 13
(c)
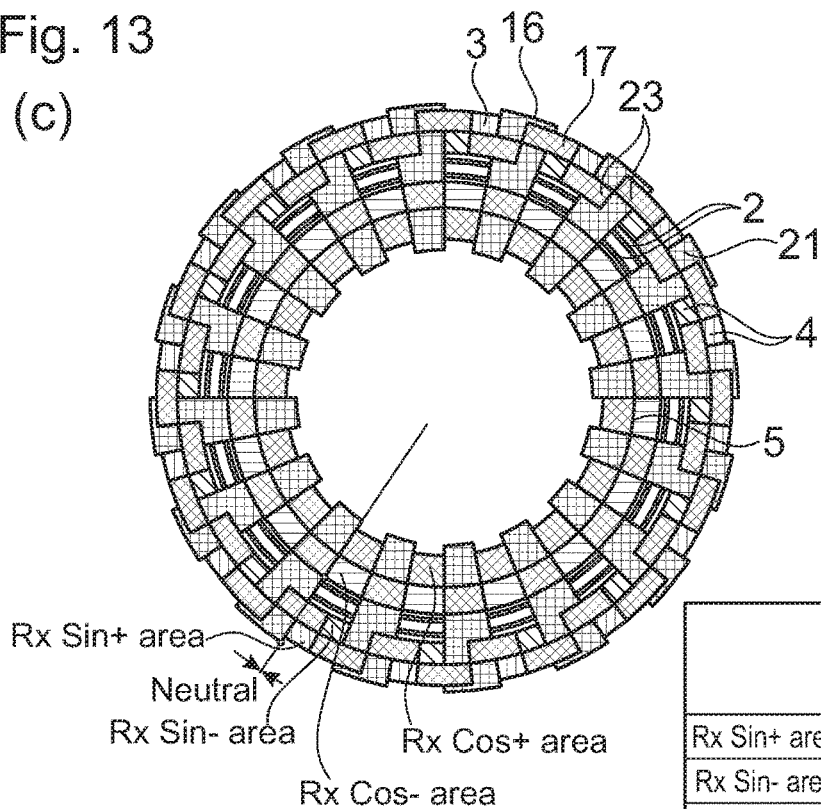
| | Exposure, Induced Voltage | Combine Voltage (V+)-(V-) |
|---|---|---|
| Rx Sin+ area | 25% | Vsin = 0 |
| Rx Sin- area | 25% | |
| Rx Cos- area | 50% | Vcos = 50% neg. |
| Rx Cos+ area | 0% | |
(d)
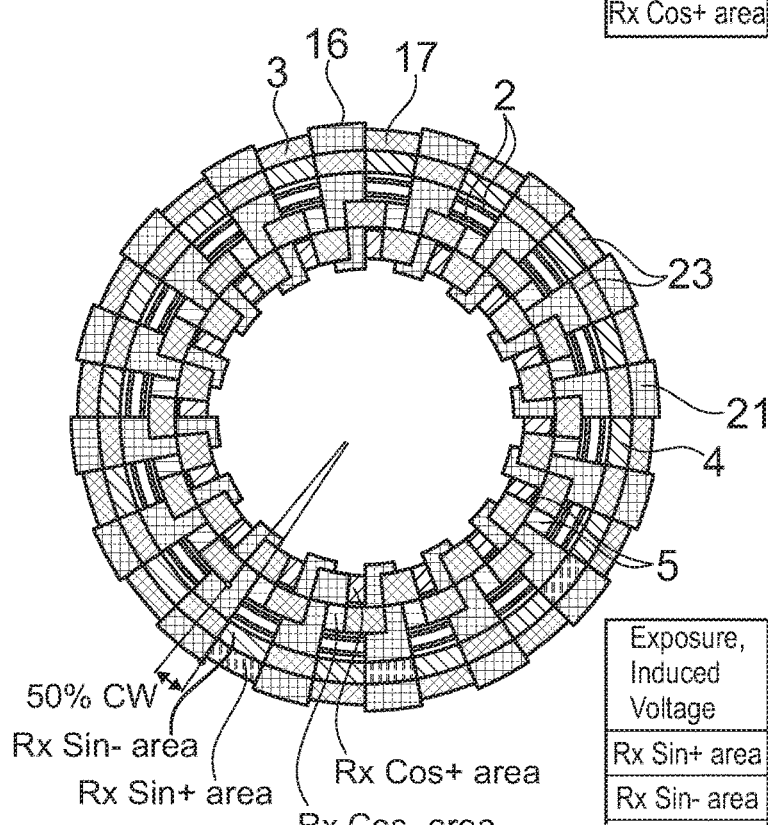
| Exposure, Induced Voltage | Combine Voltage (V+)-(V-) | Combine Voltage (V+)-(V-) |
|---|---|---|
| Rx Sin+ area | 0% | Vsin = 50% neg. |
| Rx Sin- area | 50% | |
| Rx Cos- area | 25% | Vcos = 0 |
| Rx Cos+ area | 25% | |

| | Exposure, Induced Voltage | Combine Voltage (V+)-(V-) |
|---|---|---|
| Rx Sin+ area | 25% | Vsin = 0 |
| Rx Sin- area | 25% | |
| Rx Cos- area | 0% | Vcos = 50% pos |
| Rx Cos+ area | 50% | |

Fig. 16
(a)
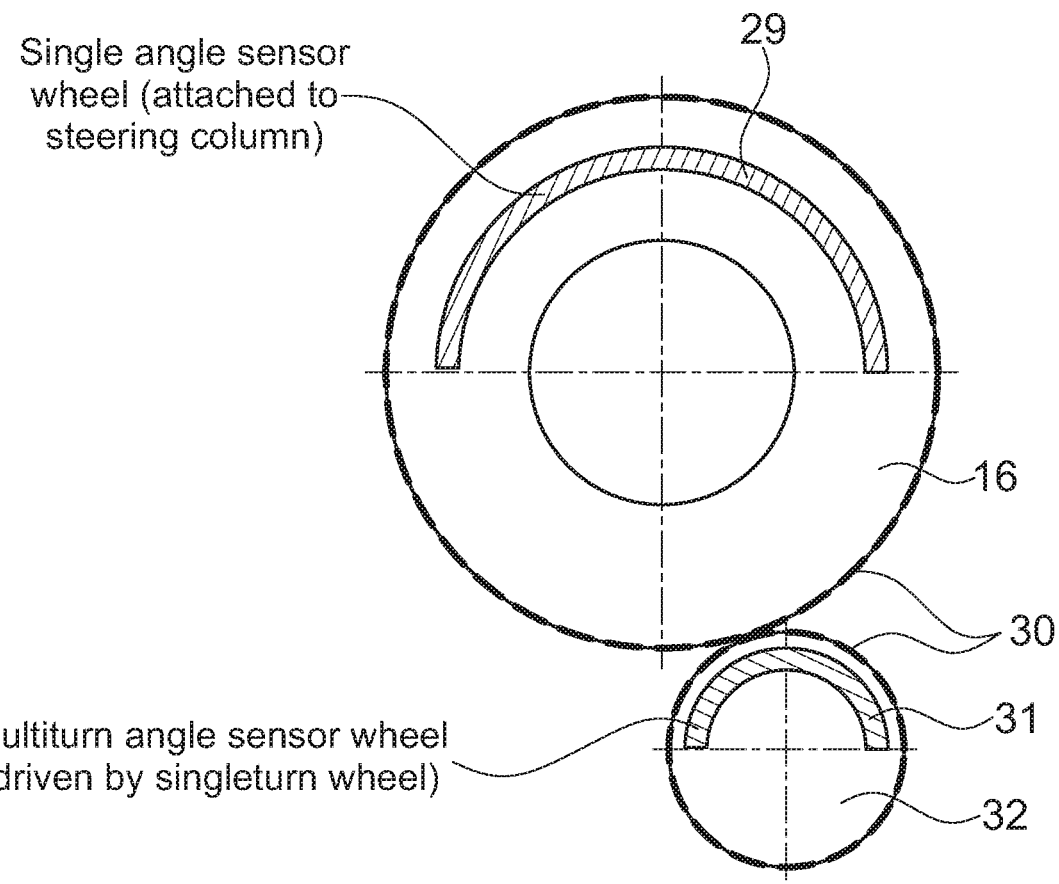
Single angle sensor wheel (attached to steering column)
Multiturn angle sensor wheel (driven by singleturn wheel)
(b)
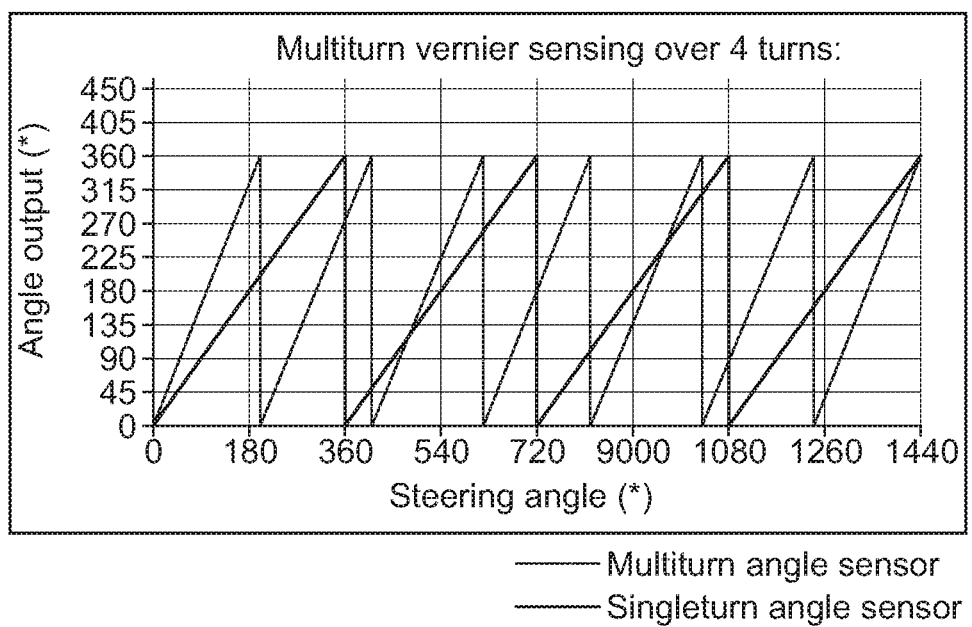

Fig. 21

| Nbr of sensors, Sensors used | Sensor plausibility check | | |
|---|---|---|---|
| | Singleturn sensor (S1,S4) | Torque sensor (S2,S5) | Multiturn sensor (S3a,3b,S6) |
| 3: 1,2,3a | S1 vs. S3a | n/a | S3a vs. S1 |
| 3: 1,2,3b | S(1+2) vs. S3b | S1 vs. S3b | S3a vs. S(1+2) |
| 4: 1,2,3a,5 | S1 vs. S3a | S5 vs. S2, S1 vs. S3b | S3a vs. S1 |
| 4: 1,2,3b,4 | S1 vs. S4, S(1+2) vs. S3b | S1 vs. S3b | S3b vs. S(1+2) |
| 4: 1,2,3b,6 | S(1+2) vs. S3b | S1 vs. S3b | S6 vs. S3b, S3b vs. S(1+2) |
| 5: 1,2,3b,4,6 | S1 vs. S4, S(1+2) vs. S3b | S1 vs. S3b | S6 vs. S3b, S3b vs. S(1+2) |
| 6: 1,2,3b,4,5,6 | S1 vs. S4, S(1+2) vs. S3b | S5 vs. S2, S1 vs. S3b | S6 vs. S3b, S3b vs. S(1+2) |

ULTRA-THIN COMBINED INDUCTIVE TORQUE AND ANGLE SENSOR FOR STEERING WHEEL POSITION SENSING

This patent application is a U.S. National Stage patent application of International Patent Application No. PCT/EP2017/082165, filed on Dec. 11, 2017, and claims priority to European Patent Application No. 16203515.8 filed on Dec. 12, 2016 and European Patent Application No. 16204462.2 filed on Dec. 15, 2016, each of which is incorporated by reference herein in its entirety.

The invention relates to an inductive torque sensor and a combined inductive torque and angle sensor for position sensing.

In vehicle steering wheel applications, both, steering angle as well as steering torque information are required.

While a steering angle sensor provides a unique value over at least one turn of the steering wheel (e.g. 0° to <360°), a torque sensor provides ABSOLUTE Information about the amount of torque being applied to the steering wheel while it is turning. This torque is being measured as the RELATIVE angular position of both ends of a torsion beam that is introduced into the steering column.

So these two types of sensors are contrary to one another: a steering angle sensor provides absolute position information of the steering wheel, a steering torque sensor provides relative position information of two ends of a torsion bar, independent of the absolute steering wheel position.

Inductive position sensors known from the state of the art uses the basic principle of the underlying inductive, eddy current technology, also discloses in U.S. Pat. No. 4,853,604. Therein, a transmission coil, excited by a high frequency current generates a primary magnetic field which induces a secondary voltage in a receiving coil that is proportional to its exposed area (inductive principle). Hence, the induced voltage is depending on the area circumference by the coil and the strength of the magnetic field generated by the transmitting coil. The receiving coil is split into two anti-serially connected loops of equal area, which create opposite voltages; hence the resulting secondary voltage without the presence of a metallic target is zero. If the metallic target is placed above one of the receiving coils, the transmitted energy of the underlying area is dissipated in the form of eddy currents and thus weakens the magnetic field in the receiving coils, which disturbs the coupling between the primary coil and the secondary coil. This leads to an imbalance of the inducted voltages of the two loops and creates a secondary output voltage >0V which is then used for position signal calculation.

A 360° hollow shaft angle sensor 1 comprises one transmitting coil Tx 2 that is printed on the outer and inner side of the ring shaped printed circuit board (PCB) 3 in the opposite winding direction (FIG. 1). The two receiver coils Rx (sin, cos) 4, 5 are arranged in sickle form and shifted by 90 degrees. A half-circle conductive target 6 rotates above the ring shaped PCB 3 and dissipates the magnetic field generated by the transmit coil underneath it, thereby creating an imbalance in the secondary coils 4, 5 and consequently a secondary voltage in these coils that is depending on the position of the target 6. Each line in the Tx 2 and Rx coils 4, 5 may represent multiple turns. The shape of the receiving coils represents the basic principle where the ends of the receiving coils are brought together in a circular shape.

In order to increase the resolution of the above-mentioned angle sensor, an incremental high resolution sensor 7 can be used. Therefore, the full circle of a conductive target ring 8 is split up in equal, repeating segments 9 (in the example of FIG. 2, 8 segments). The target ring 8 is designed such that it covers 50% of each segment 9, meaning the conductive target ring 8 is provided with equally spaced metallic 109 and non-metallic 10 parts of a segment 9, where one pair of metallic 109 and non-metallic parts 10 equals the length of one coil period 9. A segment 9 represents one period in the coils, comparing the eight lines drawn at 45°-intervals from the center of the coil in FIG. 2. Rotating the target ring 8 provides an angle output of n*(0 . . . 360°), where n is the number of segments. This arrangement, in combination with a steering angle 360° single-turn sensor (as shown in FIG. 1) can provide an absolute high resolution hollow shaft angle sensor. For example, for eight segments 9, the single-turn resolution will be increased by eight times (3 bit).

While an angle sensor provides an output signal that is proportional to the rotation angle, a torque sensor must NOT provide any change in signal output when it is rotated. Instead, a torque sensor provides a signal that is proportional to the RELATIVE position of a secondary target relative to a primary target, independent of the primary target's rotational position.

Today, several types of torque sensors are common: magneto-resistive sensors with a linear motion AMR (anisotropic magneto resistive) sensor on one side of a torsion beam and a multi-pole magnet on the opposite side of the torsion beam. This type of sensor arrangement requires a clock spring wiring as the AMR sensor is moving with the steering wheel. Or a linear Hall sensor that is measuring the magnetic flux of two multi-pole flux concentrators. Or an inductive solution measuring the relative difference of two absolute angle sensors.

Typical torque sensor applications measure torque as a rotational movement where the twist of a torsion beam is measured. Both ends of the torsion beam are brought together onto a single plane and are compared against each other.

Furthermore, combined torque and angle sensors are known, which typically use two absolute angle position sensors (each one mounted on either side of a torsion beam) and calculate the torque by the relative difference of both angle positions. The disadvantage of this solution is that any non-linearity on either sensor is mis-interpreted as torque as it provides a non-zero result (angle1−angle2) even if no torque is applied to the steering wheel. Moreover, the measurement range of the torque cannot be adjusted easily as it is dependent on the design of the torque sensor, e.g. pole length of the magnets in magnetic torque sensors, coil design in inductive torque sensors.

Also combined inductive & Hall multi-turn TAS (torque and angle sensor) are known (presented by Hella at the "Sensoren im Automobil" Congress in Germany in 2014). This solution however requires a shielding inside the sensor printed circuit board (PCB) and cannot provide a plausibility check of the torque sensor with the subsequent proposed combined 3-sensor design, where one sensor is measuring the 360° angle of the input shaft (one end of the torsion beam), a second sensor is measuring the 360° angle of the output shaft (the opposite end of the torsion beam) and a third sensor, connected to the input shaft by a reduction gear is measuring the multiple turns of the steering wheel. The calculation of the torque as the difference between two 360° angle sensors provided in the state of the art is not very accurate, because the errors are larger due to non-linearity of the angle sensors.

It is therefore an object of the invention to propose a torque sensor as well as a combined torque and angle sensor which does not require a shielding of the sensor PCB and which can provide a plausibility check of the torque sensor when using only three sensors.

The object of the invention will be solved by an inductive torque sensor for detection of torque movements comprising a stationary printed circuit board (PCB) with sensing coils, a primary target and a secondary target, whereas the primary target and secondary target each comprise of different metallic patterns, whereas the PCB, the primary and secondary target are stacked over each other and the primary and secondary target are placed either above and/or below the sensing coils, wherein a torque movement detection range is defined by a line width and a space width of the metallic pattern of the primary target and secondary target if the secondary target is moved relative to the primary target whereas each target covers 50% of the sensing coils and the combined coverage of both targets varies between 50% and 100% depending on the relative position between the two targets. Both or two targets mean the primary and secondary targets. The primary target is located above the sensing coils on the PCB, whereas the secondary target can be placed either over the primary target or below the sensing coils.

A torque sensor provides a signal that is proportional to the RELATIVE position of a secondary target relative to a primary target, independent of the primary target's position. The increasing and decreasing shading effect is caused by two targets having different patterns, placed either above and/or below the sensing coils on the PCB. The total torque movement range is defined by the line and space width of the metallic patterns of the primary and secondary target. The signal proportional to the relative position is achieved by shading more or less area of the secondary coils.

In an embodiment of the inventive torque sensor, the sensing coils on the PCB comprise a transmitting coil Tx and a receiving coil Rx, whereas the receiving coil is split into a positive and a negative loop area (Rx+, Rx−), and the transmitting coil Tx surrounds the receiving coil on the outer edge. The transmitting coil Tx generates a magnetic field over the receiving coil Rx. The Rx coil is split into a positive and negative loop. Both loops cover the same area: Rx+=Rx− or precisely $A_{Rx+}=A_{Rx-}$.

In another embodiment of the inventive inductive torque sensor, the sensing coils comprise two equally shaped receiving coils, each split into a positive and negative loop area ($Rx_{sin}-/+$ and $Rx_{cos}-/+$), whereas Tx surrounds the two receiving coils on their outer edge, respectively. In order to provide improved stability towards airgap variations between target and coils, a ratiometric approach is preferred. In this design, two equally shaped coil designs are used ($Rx_{sin}$ and $Rx_{cos}$). For example, the transmitting coil Tx is wound in an eight-shape, generating two opposite fields in the areas for $Rx_{sin}$ and $Rx_{cos}$ respectively. The receiving coil Rx for each area is split into a positive and negative loop. All four loops cover the same area ($Rx_{sin}+=Rx_{sin}-=Rx_{cos}+=Rx_{cos}-$ or more precisely $A_{Rxsin+}=A_{Rxsin-}=A_{Rxcos+}=A_{Rxcos-}$; both expression meaning the same, if used in the sense of the loop area of the coils), whereas the transmitting coil surrounds the four receiving coils on their outer edge with its two loops of the eight-shaped design. For exemplary illustration such an embodiment is shown in FIG. 6a).

In a preferred embodiment of the inventive torque sensor, the metallic pattern of the primary target is strip-shaped. Strip-shaped or strip-shaded mean that the metallic pattern is formed in electrically conducting (=metallic) and electrically non-conducting (=non-metallic) stripes or parts on the primary target. But only the metallic pattern becomes active in the operation mode of the torque sensor. The metallic pattern can be aluminum, copper, or another metal.

In another preferred embodiment of the inventive torque sensor, the metallic pattern of the secondary target is arranged in a checkerboard-like pattern of two rows. The secondary target is moving relative to the primary target. Checkerboard-like means that the metallic parts are arranged in two rows, whereas the metallic parts of a first row are placed in the gaps between the metallic parts of the second row, forming a checkerboard-like pattern. The metallic pattern can be aluminum, copper, or any other electrically conducting material.

In a further preferred embodiment of the inventive inductive torque sensor, the metallic pattern of the secondary target comprises two groups of the checkerboard-like pattern of two rows, whereas the two groups are displaced a half pitch of the line width to each other. Two groups of checkerboard-like pattern mean that a first group consists of two rows (row 1-2) and a second group consists of two rows (rows 3-4). A displacement of a half pitch means that the second group of the checkerboard-like pattern (rows 3-4) is displaced by a half width of a line width of a metallic part of the checkerboard-like metallic pattern. This results in a 90 electrical degrees phase shift relative to row 1-2. This shift of the secondary target pattern results in the Rx cos signal being shifted by 90 electrical degrees from the Rx sin signal. This approach allows for a wider movement range, as the full phase of 360° electrical degrees can be utilized.

In an embodiment of the inventive inductive torque sensor, a metallic part of the checkerboard-like pattern has a rectangular shape providing a triangular output response of the torque sensor or a metallic part of the checkerboard-like pattern has a sinusoidal shape providing a sinusoidal output response of the torque sensor. For illustration purposes FIG. 6c shows a metallic pattern of the secondary target, whereas a part of the checkerboard-like pattern has a rectangular shape. If the shape of the single parts of the metallic pattern of the secondary target is rectangular, the induced voltages in the receiving coils on the PCB have a triangular shape as is exemplary shown in FIG. 7e. By changing the rectangular shape of the metallic parts on the metallic pattern of the secondary target to a sinusoidal shape as shown exemplary in FIG. 9, the output response versus torque, hence the voltages in the receiving coils on the PCB become also sinusoidal shaped, which allows the use of an arctangent algorithm (e.g. CORDIC) to calculate the torque: torque=angle=arctan(sin(x)/cos(x)) (FIG. 9e).

In another embodiment of the inductive torque sensor, the inductive torque sensor is rotational symmetric with a circular shape of the sensing coils, the primary and secondary target. The principles described above can be used for a hollow shaft, rotational motion ratiometric torque sensor. A transmitting coil surrounds the receiving coils and generates a magnetic field over the receiving coils. The receiving coils comprise two anti-serial coil loops for the $Rx_{sin}$ and two anti-serial coil loops for the $Rx_{cos}$. The four receiving coils loops have the same area size. Furthermore, the primary target is circular shaped, forming a primary target wheel with a line & space pattern, covering 50% of the entire coil area. The secondary target is also circular shaped, forming a secondary target wheel with a checkerboard-like pattern, alternately covering 50% of the positive and negative coil loops of each $Rx_{sin}$ and $Rx_{cos}$, whereas the metallic patterns of the secondary target wheel covering the $Rx_{sin}$ and $Rx_{cos}$ loops are mechanically rotated by ½ the target width or a half-line width of the line width, which creates a 90 electrical degrees phase shift between the two output voltage $V_{RxSin}$ and $V_{RxCos}$ by moving the two targets relative to one another, each coil loop is covered between 50 and 100%, depending on the relative position of the two targets. Alternatively, a sinusoidal-shaped secondary target pattern, as described earlier may be used instead of a checkerboard-like rectangular target pattern. For the described rotational torque sensor, the rectangular shape is simply transformed into a circular shape, essentially by stretching the linear sensor design, which was used for a better understanding, into a circle such that the left end (0°) and the right end (360°) meet at the starting and end point of the circle. Due to the circular symmetric design of the rotational torque sensor, the end connections of each coil (Tx, $Rx_{sin}$, $Rx_{Cos}$) may be located at any angle.

In another embodiment of the inventive torque sensor, the receiving coils are electrically connected anti-serial. This is already described above. The receiving coils comprise two anti-serial coil loops for the $Rx_{sin}$ and two anti-serial coil loops for the $Rx_{cos}$.

The object of the invention will also be solved by a combined inductive torque and angle sensor for position sensing, comprising a stationary printed circuit board with a sensor integrated circuit and sensing coils, a primary target wheel, a secondary target wheel and a torsion beam with a steering column side and a steering wheel side, whereas the primary target wheel is centrally stacked on the torsion beam on the steering column side and comprises a metallic pattern for a steering angle 360° single-turn sensor and a first metallic pattern for the torque sensor, and the secondary target wheel is centrally stacked on the torsion beam on the steering wheel side comprising a second metallic pattern of the torque sensor.

The advantage of the invention is that the angle and torque sensor are combined therein that both sensors are built on the same printed circuit board (PCB) and using the same target wheels. The combined sensor (short form for the ultra-thin combined inductive torque and angle sensor) is based on inductive sensing technology that incorporates both the sensor integrated circuit (IC) and sensing coils on a stationary, non-moving PCB which greatly reduces the risk of failure, for example broken clock spring wires, loose magnets and it simplifies the assembly due to no moving electronic parts. There is no need to use any clock spring wiring. The sensor signals are measured by the sensing coils, whereas the sensor signals are analyzed and calculated in the sensor IC in order to obtain the required measurement results of torque and angle position of a steering wheel or other moving devices. It is very advantageous that the combined torque and angle sensor can be fabricated ultra-thin. Ultra-thin means typically in the range of 4 mm or less, where the stack comprises of the printed circuit board (e.g. 1 mm thickness), an airgap between PCB and first target (e.g. 1 mm gap) a first target (e.g. 0.5 mm thickness), a second gap between first and second target (e.g. 1 mm thickness) and a second target (e.g. 0.5 mm thickness).

In an embodiment of the inventive combined torque and angle sensor, the printed circuit board comprises a sensing angle coil for the steering angle 360° single-turn sensor and sensing torque coils for the torque sensor. The sensing torque coils comprise a transmitting coil Tx and a receiving coil Rx, whereas the receiving coil is split into a positive and a negative loop area (Rx+, Rx−), and the transmitting coil Tx surrounds the receiving coil on an outer edge; it is also possible that the sensing torque coils comprise two equally shaped receiving coils, each split into a positive and negative loop area ($Rx_{sin}-/+$ and $Rx_{cos}-/+$), whereas Tx surrounds the two receiving coils on their outer edge, respectively. So in the simplest form of the sensor, the PCB comprises two sensing coils arrangements, one for the steering angle 360° single-turn sensor and one for the torque sensor. In another embodiment, the transmitting Tx coil can only comprise of one outer coil with no inner coils or combinations thereof.

In a preferred embodiment of the inventive combined torque and angle sensor, the primary target wheel is rotational symmetric and the metallic pattern for the steering angle 360° single-turn sensor is a half-circle conductive line along a circumference of the primary target wheel and the metallic pattern of the primary target wheel for the torque sensor is designed radial with conductive lines and spaces of equal width such that it covers a total 50% of a transmitting torque coil and receiving torque coils on the printed circuit board (PCB). The conductive lines are positioned radial from the center of the primary target wheel, whereas the lines cover 50% of the sensing torque coils on the PCB for each $Rx_{sin}$ and $Rx_{cos}$, respectively.

The torque signal is generated by overlapping and non-overlapping areas of the two target wheels. When the metallic patterns are overlapping, there is an exposed area between the patterns which leads to reduced damping of the underlying magnetic field in this area, see FIG. 7a, patterns 21 and 23, exemplary. In areas where the metallic patterns on the two target wheels are not overlapping, the exposed area is smaller or zero, which leads to higher damping of the transmit signal (see FIG. 7d, patterns 21 and 23)

In another preferred embodiment of the inventive combined torque and angle sensor, the secondary target wheel is rotational symmetric and the metallic pattern on the secondary target wheel for the torque sensor is designed in two groups of a checkerboard-like pattern of two rows, whereas the two groups are displaced a half pitch of a line width to each other. Also the lines on the secondary target wheel are positioned radial from the center of the secondary target wheel to the outer edge of the target wheel in two concentric rings. But the metallic lines on the secondary target wheel of one of the two groups of rows, forming two concentric rings are shifted by 180°, namely the lines and space of the rings form a checkerboard-like pattern. Furthermore, the two groups are displaced a half pitch of a line width to each other. This means that the outer circle of two checkerboard-like rows is shifted by a half line width according to the inner circle of two checkerboard-like rows.

The advantage of the arrangement is that the mechanical torque range can be adjusted by the width of the checkerboard-like marks on the torque wheel, id est that the metallic target can be simply changed. It is not necessary to change the electronics, such as coil design or sensor chip settings. So it is easier to adapt the present steering wheel position. If both receiving torque coils ($Rx_{sin-}$ and $Rx_{sin+}$) or ($Rx_{cos-}$ and $Rx_{cos+}$) on the PCB are not covered or covered by the same amount of metallic pattern, the Rx output (the receiving torque coil output) is 0V. If receiving torque coil $Rx_{sin}$ and receiving torque coil $Rx_{cos}$ are covered by a different amount of the metallic pattern, the output is different to 0V, more precisely lower or higher than 0V, depending on the covered parts of the $Rx_{sin}$ and $Rx_{cos}$ receiving torque coils.

Steering wheel sensors typically require absolute angle sensor calculation over several turns (e.g. 3 or 4 turns). A simple way to provide multi-turn counting is to detect an angle transition 0°<->360° and to increment/decrement a counter, each time the angle rolls over the 0°/360° transition. In such case, the counter must be powered continuously as the multi-turn information is otherwise lost when the power to the sensor IC is removed. While this may be acceptable in some cases, extended safety is provided by keeping the multi-turn information even when power is removed and restored or the sensor was rotated while power is off. This can be achieved by means of two sensors, a steering angle 360° single-turn sensor and a multi-turn sensor coupled by a mechanical gear. With a proper selection of the gear ratio (e.g. 3:7, 4:7, 4:9), the phase difference of the two sensors is then unique over several turns. So, in a further preferred embodiment of the combined inductive torque and angle sensor, the combined inductive torque and angle sensor comprises a multi-turn vernier cog wheel that is drivable connected to the primary target wheel or the secondary target wheel. On the primary target wheel the metallic pattern of the steering angle 360° single-turn sensor is located and on the multi-turn vernier cog wheel a second 360° single-turn sensor is located, both providing absolute angle measurement values. This further target wheel is called vernier cog wheel, because the so-called vernier principle allows absolute angle calculation over multiple turns by including both angles values as well as the phase difference of the two. With proper selection of the gear ratio (e.g. 3:7, 4:7, 4:9), the phase difference of the two sensors is then unique over several turns.

For using this absolute multi-turn extension, in one embodiment of the combined inductive torque and angle sensor, the PCB comprises a multi-turn vernier sensor, a sensing multi-turn vernier coil and means for calculating a unique absolute steering angle over several turns of the primary target wheel, whereas the metallic pattern of the multi-turn vernier sensor on the multi-turn vernier cog wheel is superimposable with the sensing multi-turn vernier coil on the PCB. By combining the angle information of the steering angle 360° single-turn sensor and the multi-turn vernier sensor, one on the primary target wheel and one on the multi-turn vernier cog wheel, a unique absolute steering angle can be calculated over several turns of the primary wheel, even if the wheel was moved while the power to the sensor was turned off while it was moving and then restored. In other embodiments of the multi-turn vernier sensor, one or both sensors may also have less than 360° angle range, e.g. using an AMR sensor with 180° angle range and a vernier ratio of e.g. 6:14, 8:14, etc.

Alternatively to mechanically link the multi-turn vernier cog wheel or vernier target wheel to the primary torque/steering target wheel, the multi-turn vernier target wheel may also be mechanically linked to the secondary torque target wheel. In this case, there is no longer a direct link of the steering angle 360° single-turn sensor and the multi-turn vernier sensor. Rather, the link between the two target wheels includes the torque. In this way a plausibility check of the torque is possible. So, in a preferred embodiment of the combined inductive torque and angle sensor, the PCB comprises a multi-turn vernier sensor and a sensing multi-turn vernier coil for performing a plausibility check of the torque, whereas the plausibility check is performable with only three sensors, one steering angle 360° single-turn sensor, one torque sensor and one multi-turn vernier sensor, respectively. In other words, this means that one sensor is measuring the 360° angle of the input shaft (one end of the torsion beam), a second sensor is measuring the 360° angle of the output shaft (the opposite end of the torsion beam) and a third sensor, connected to the input shaft by a reduction gear is measuring the multiple turns of the steering wheel.

In a very preferred embodiment of the inventive combined inductive torque and angle sensor, the multi-turn cog wheel and the primary or secondary target wheel form a gearing mechanism with a gear ratio n:m of non-integer, whereas n is the number of primary wheel turns that need to be uniquely detected and m is the number of turns on the multi-turn wheel. m is typically an odd number. It is advantageous that the gear ratio between the wheels can be freely selected as long as it is a non-integer number. Exemplary, 4:7 is acceptable as it will repeat after 4 turns, 4:6 is not acceptable as it will repeat after 2 turns (but should repeat after 4 turns).

In another preferred embodiment an electrical turn counter is added to the primary target wheel and multi-turn vernier cog wheel.

The invention will be explained in more detail using exemplary embodiments.

The appended drawings show

Figure 2:
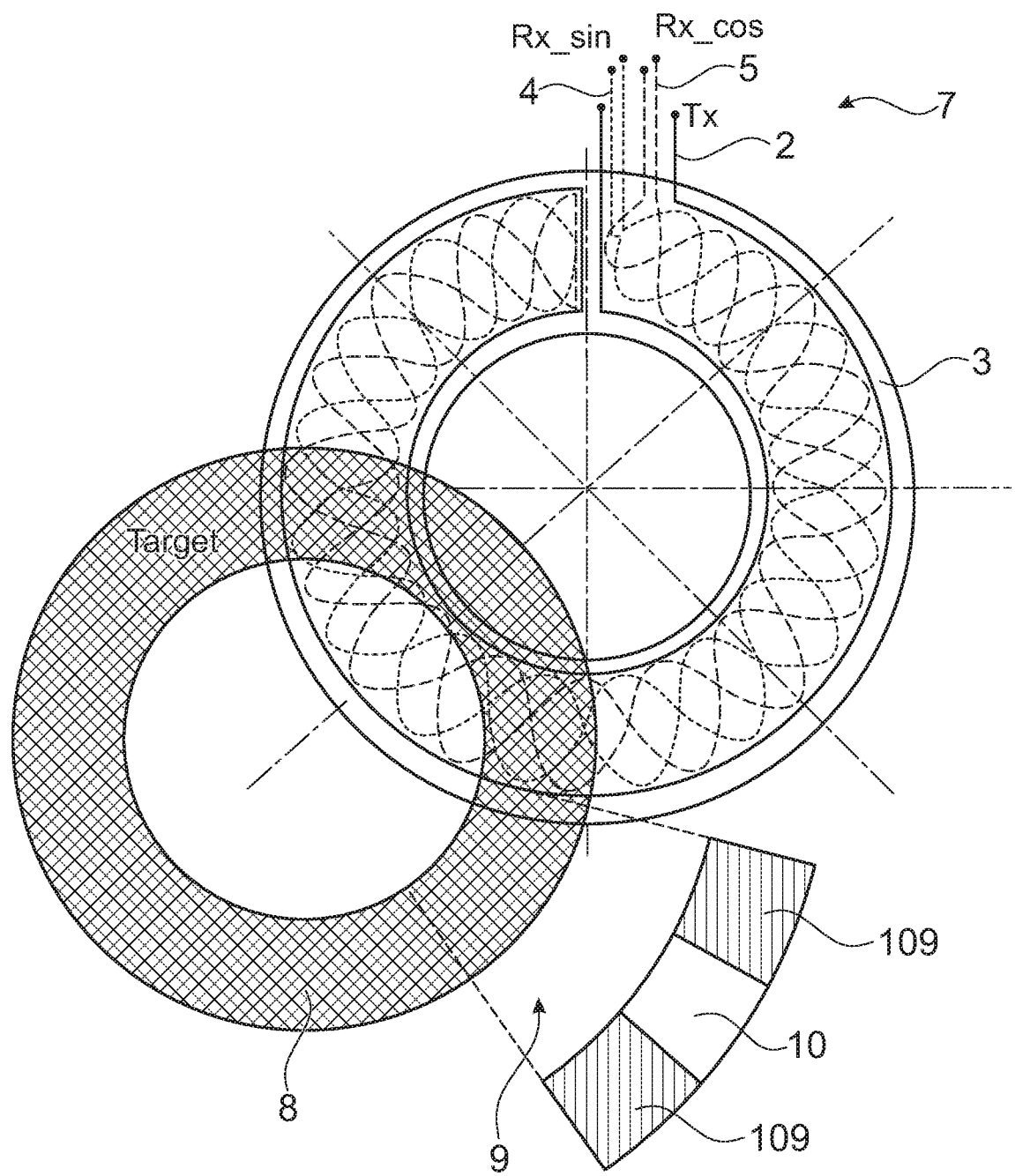
Figure 3:
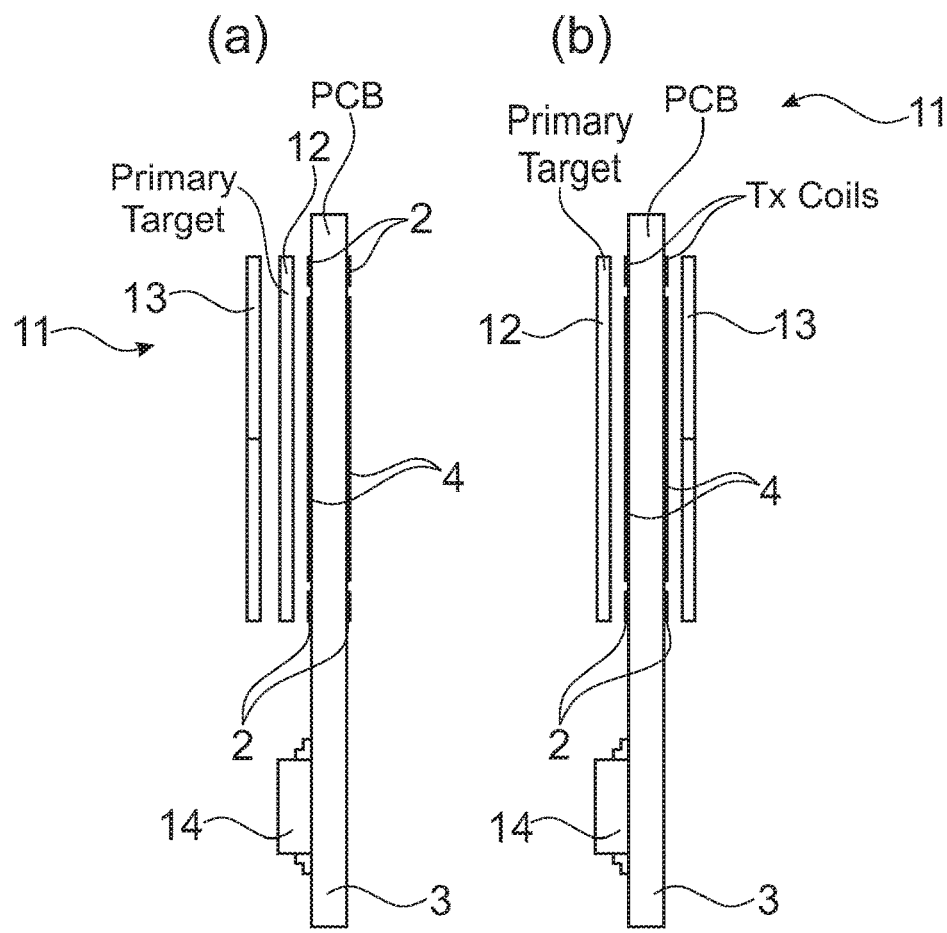
Figure 4:
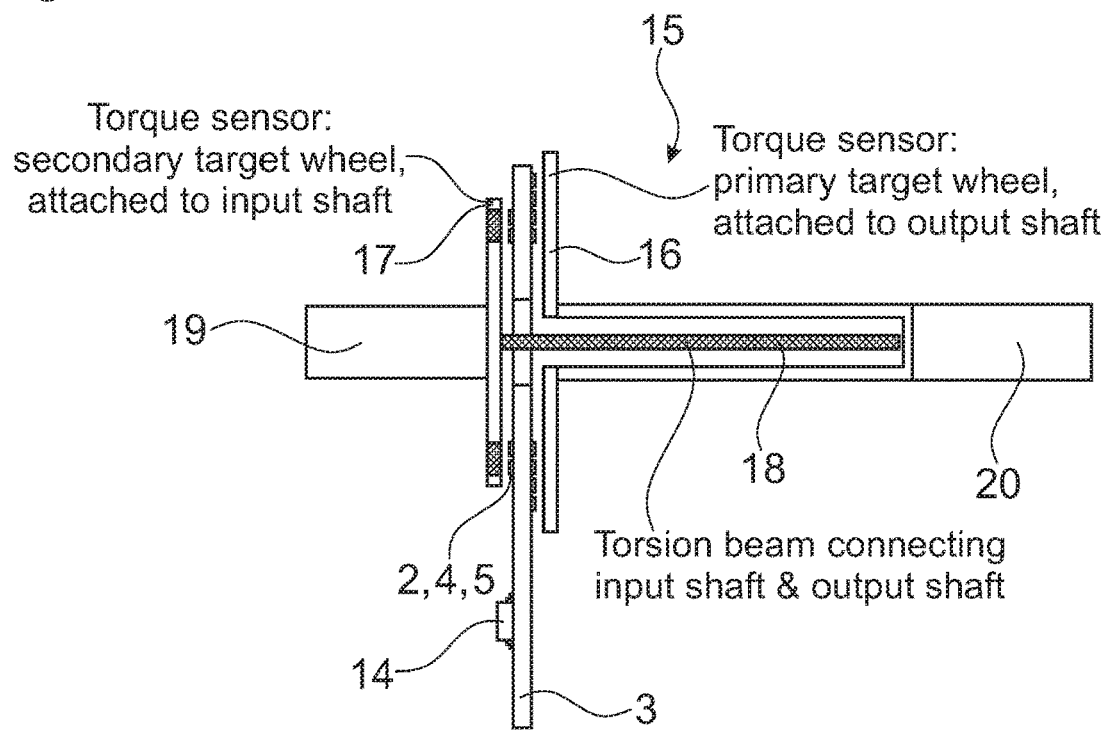
Figure 10:
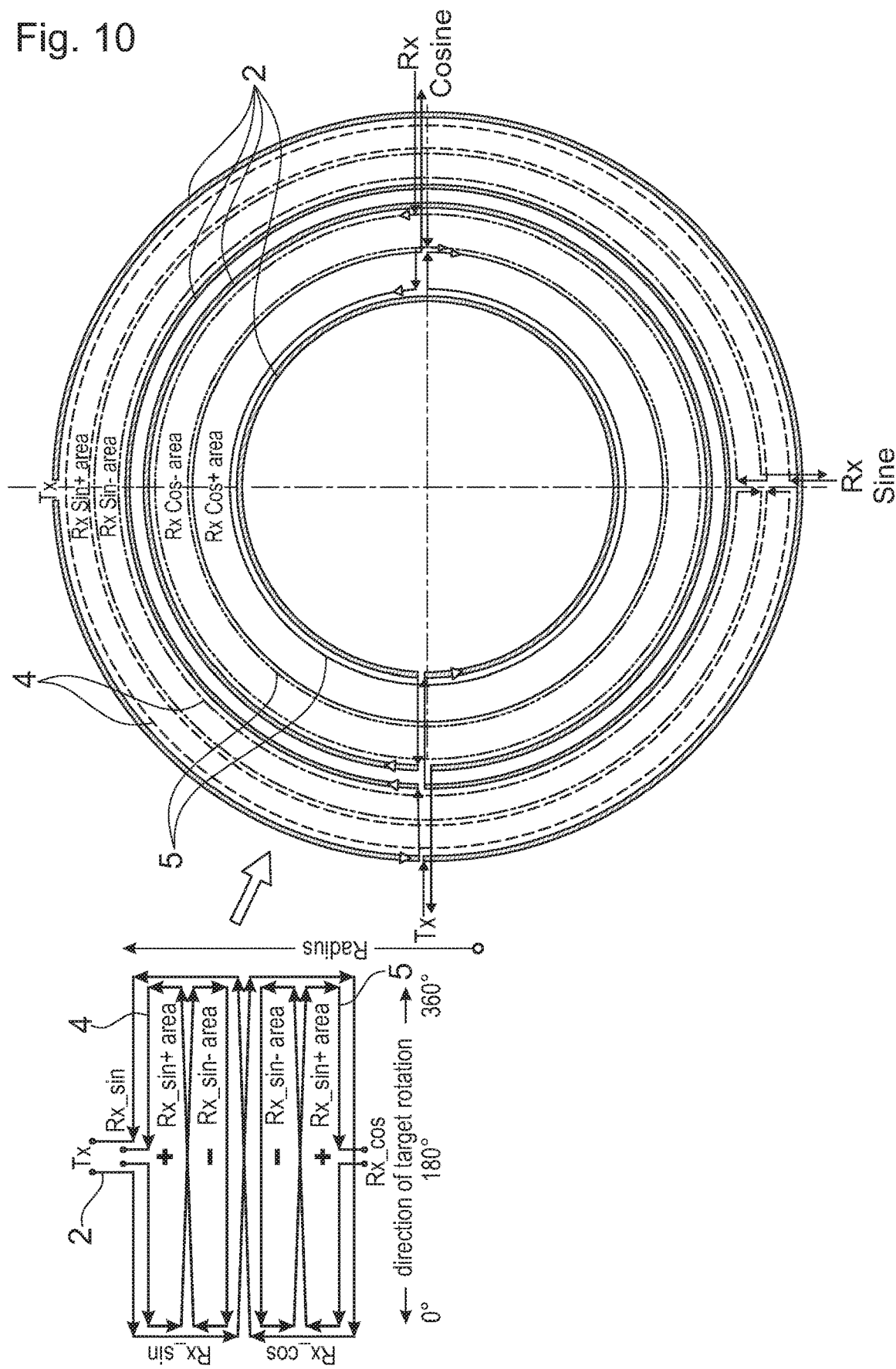
Figure 11:
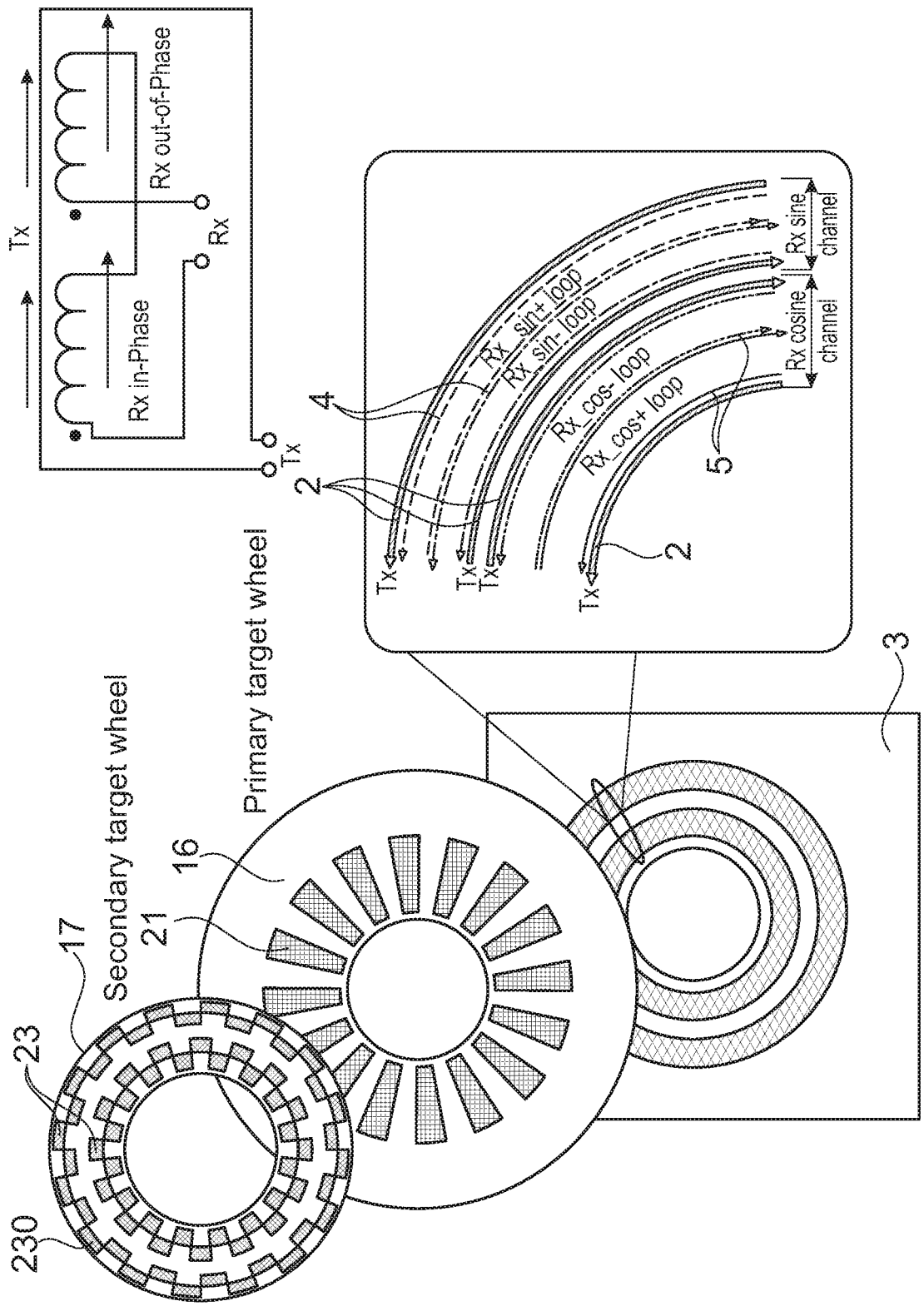
Figure 12:
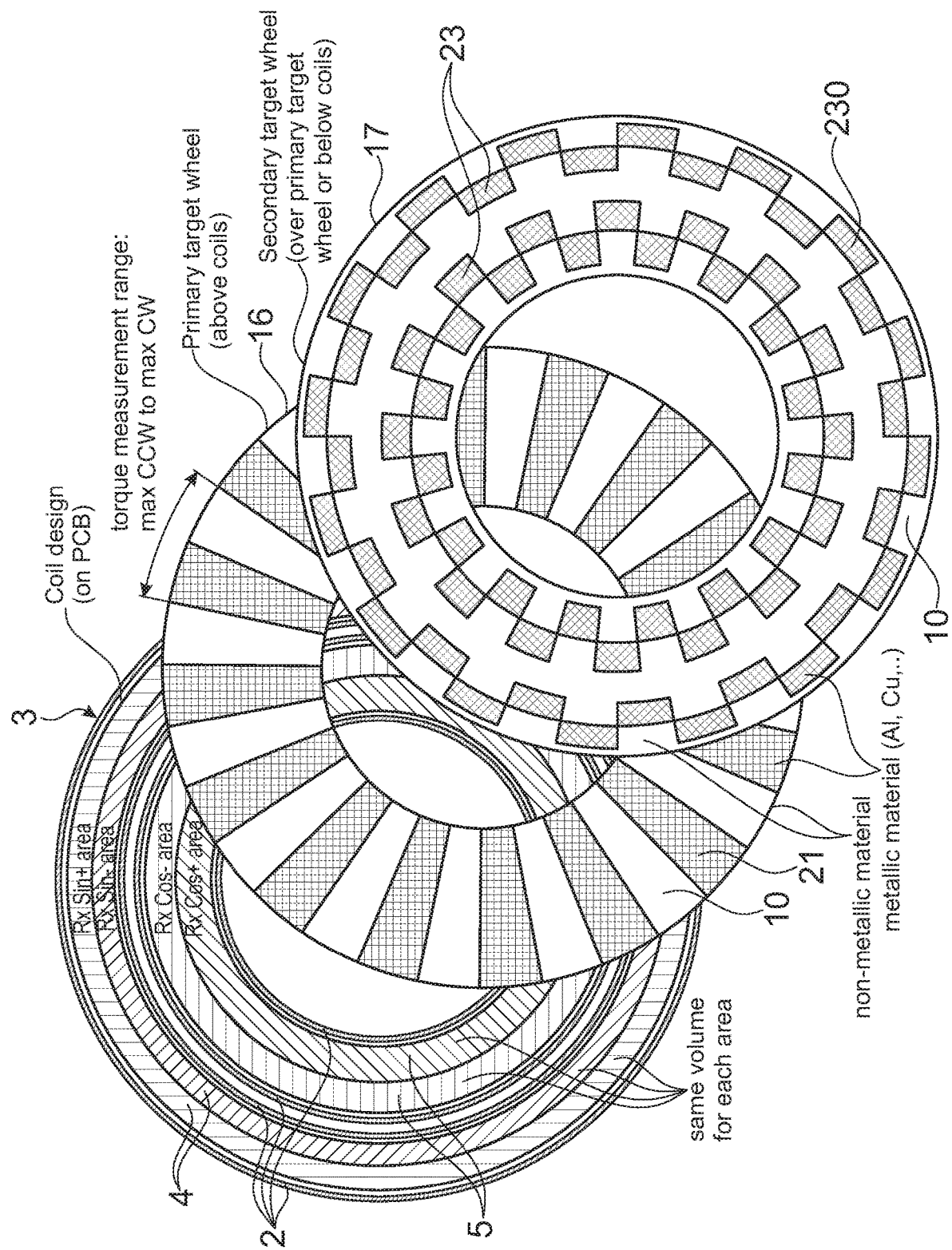
Figure 14:
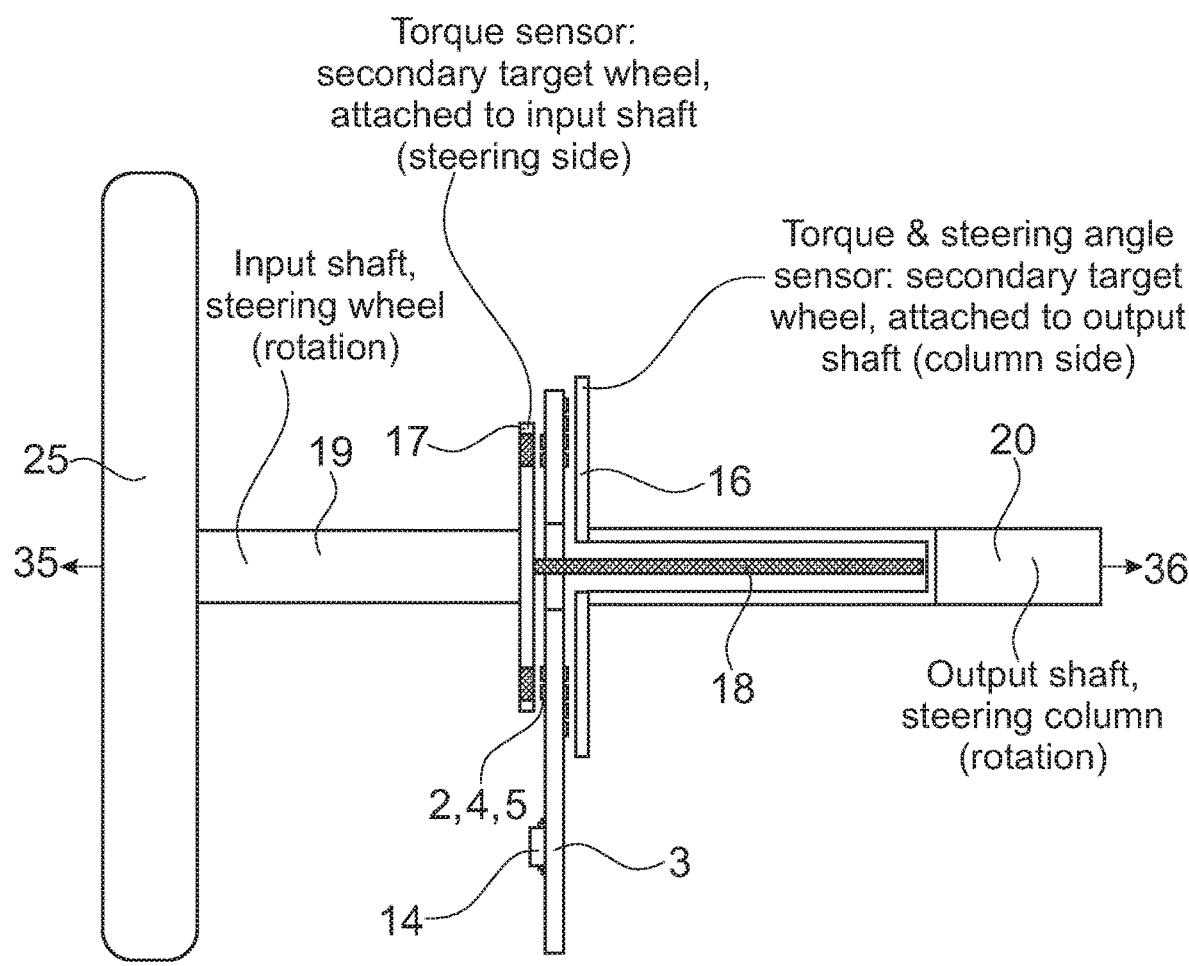
Figure 15:
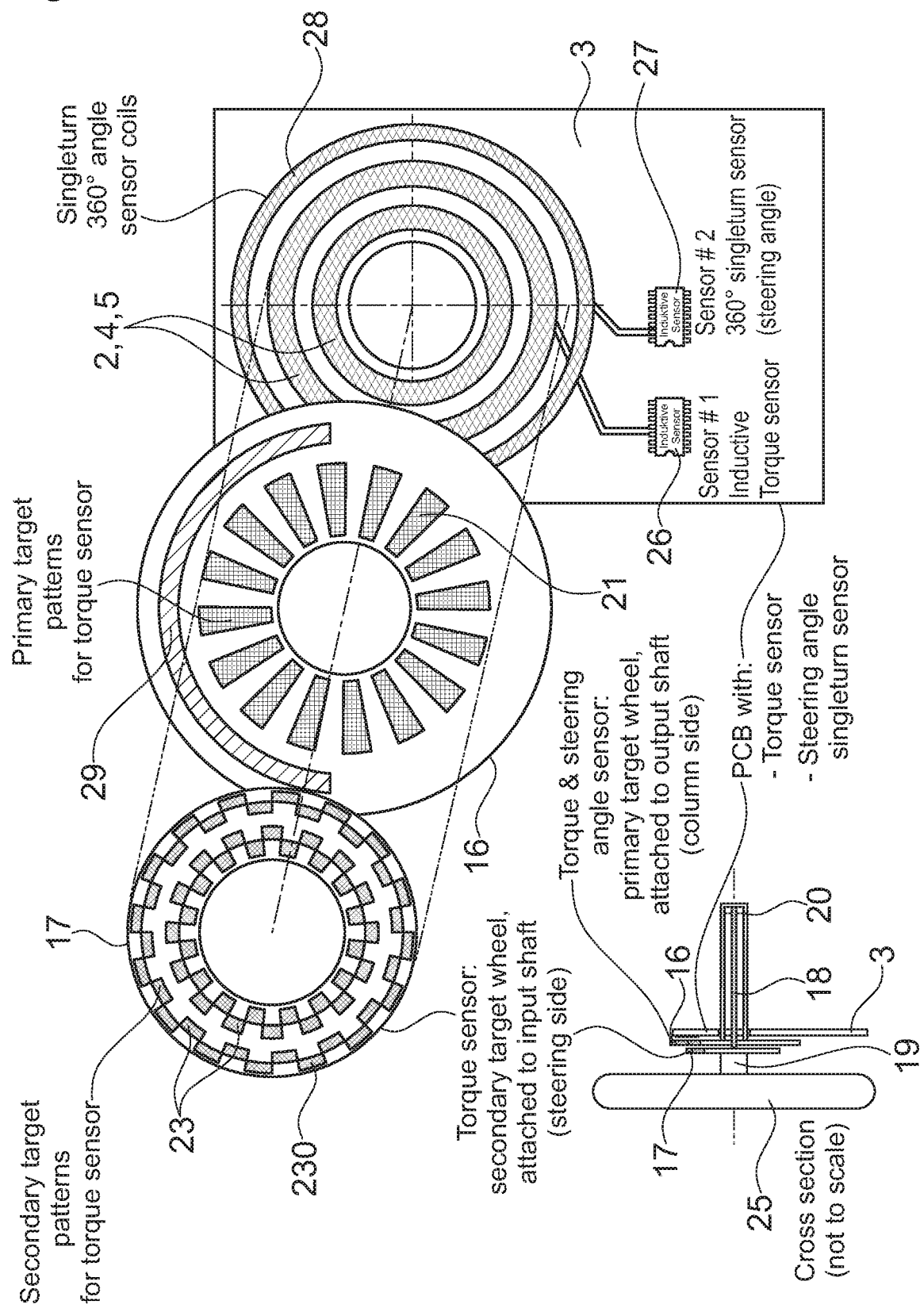
Figure 17:
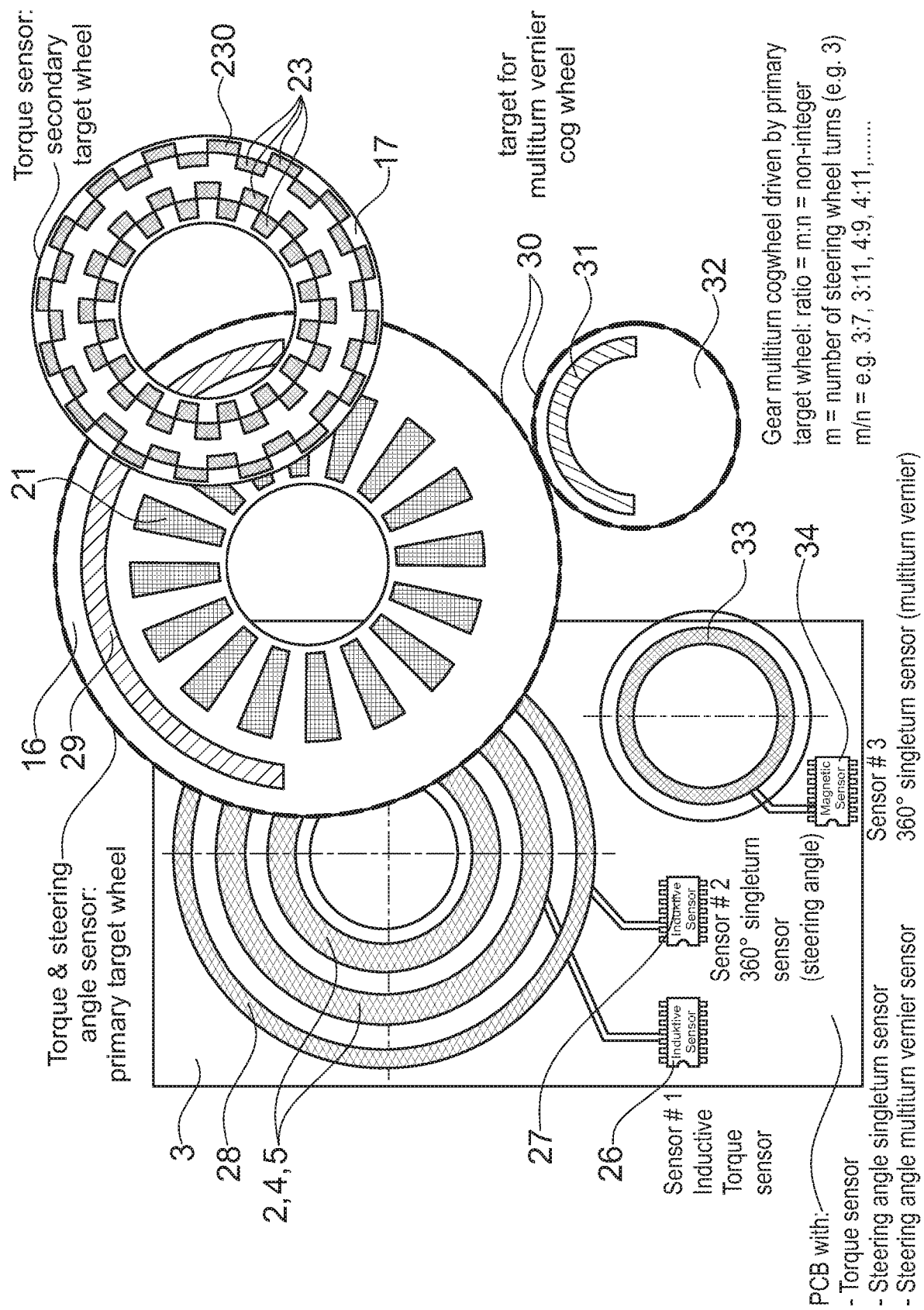
Figure 18:
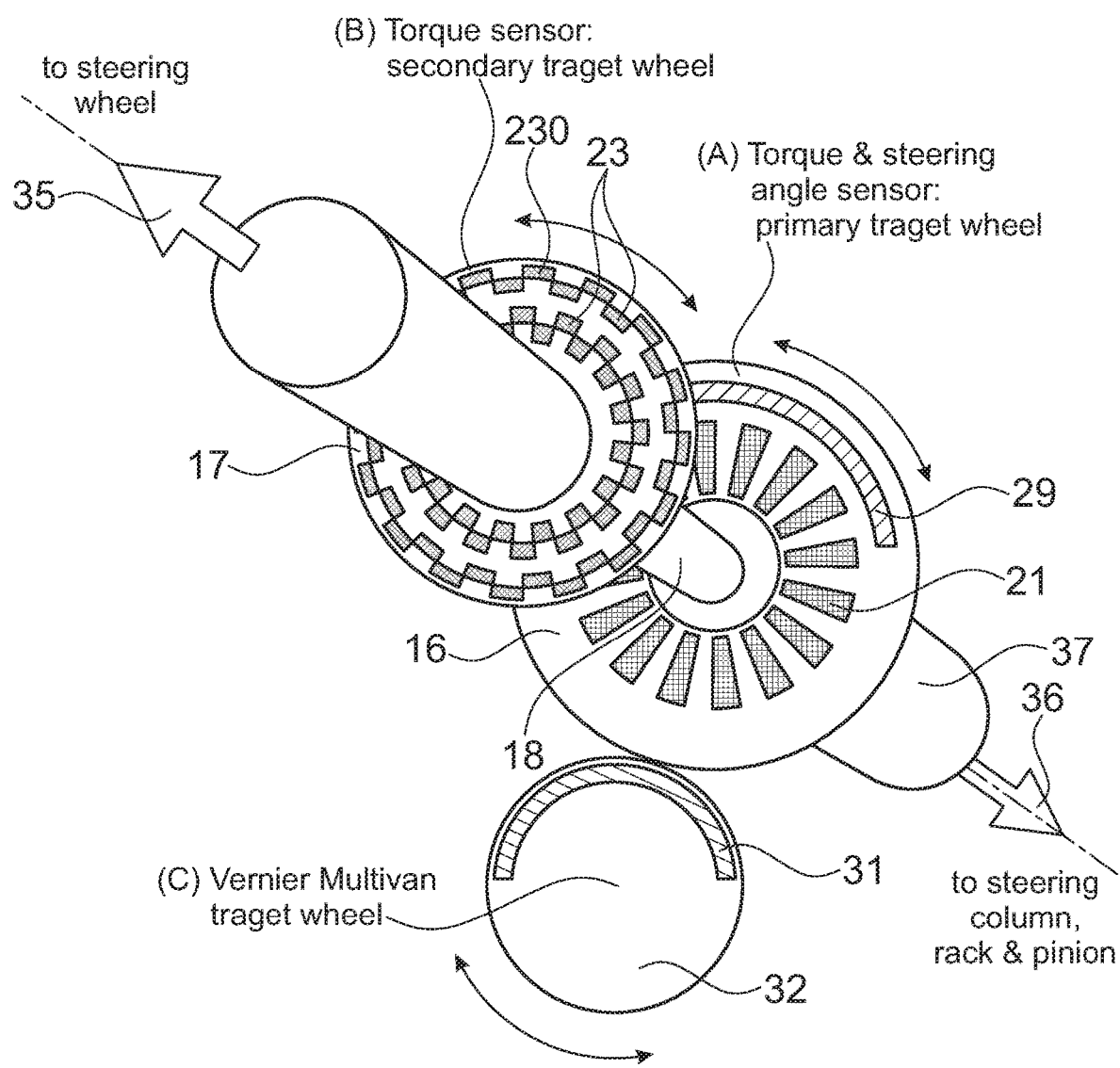
Figure 19:
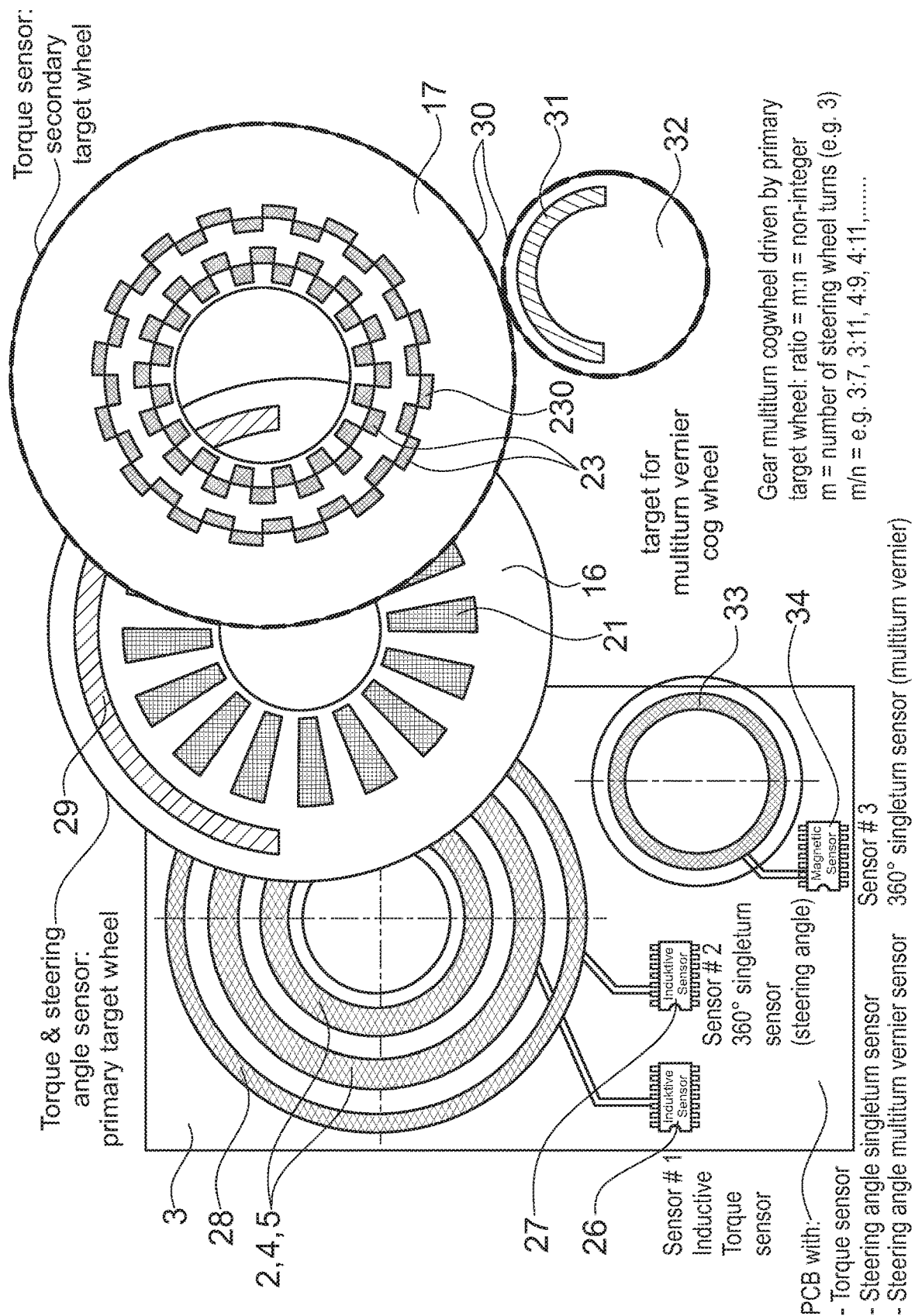
Figure 20:
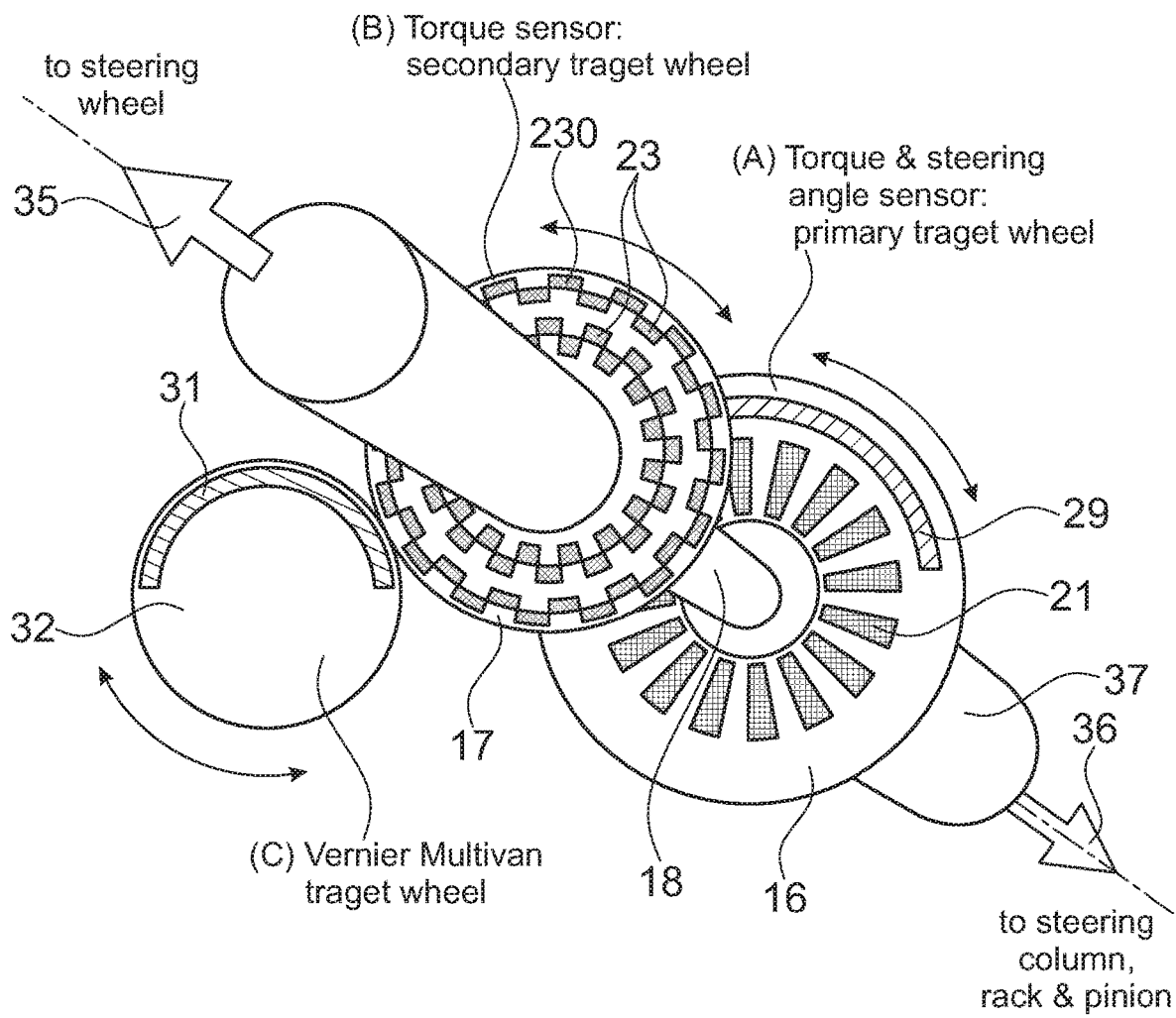

FIG. 1 A 360° hollow shaft angle sensor;

FIG. 2 A high resolution incremental angle sensor;

FIG. 3 A torque sensor design with a printed circuit board and a primary and a secondary target, with different position of the targets relative to the PCB; a) Primary and secondary target stacked on top of each other; b) Primary and secondary target on either side of the printed circuit board;

FIG. 4 Cross-section of the inventive torque sensor attached to a torsion beam;

FIG. 5 Schematic representation of a torque sensor in a linear design for easier understanding: a) transmitting and receiving coils, b) metallic pattern of a primary target, c) metallic pattern of a secondary target, d) secondary target is at max left displacement relative to primary target, e) secondary target is at neutral position relative to primary target, f) secondary target is at max right displacement relative to primary target;

FIG. 6 Ratiometric linear torque sensor design for easier/better understanding: a) sensing coils are wound in an eight-shape, two receiving coils are split into a positive and negative loop, b) metallic pattern of the primary target; c) metallic pattern of the secondary target;

FIG. 7 Ratiometric linear torque sensor design for easier/better understanding a) to d): the primary target is stationary, while the secondary target moves from left to right, exposing more or less area of the four secondary areas $Rx_{sin}+$, $Rx_{sin}-$, $Rx_{cos}+$, $Rx_{cos}-$; and e) analysis results according to the detected output voltages of $Rx_{sin}$ and $Rx_{cos}$ and its relation to each other;

FIG. 8 Overview of the calculation formulas of the torque sensor values at different positions;

FIG. 9 Sinusoidal shaped metallic pattern of the secondary target for generating a sinusoidal response (a) to d); and analysis results according to the detected output voltages of $Rx_{sin}$ and $Rx_{cos}$ and its relation to each other;

FIG. 10 Hollow shaft torque sensor coil design, including a corresponding linear design for better understanding;

FIG. 11 A torque sensor design with a printed circuit board and a primary and a secondary target wheel with a zoomed section of the transmitting coil and receiving coils;

FIG. 12 Torque sensor target design;

FIG. 13 Torque sensor with the printed circuit board and the primary and secondary target wheel with the metallic pattern stacked over each other: a) maximum counterclockwise position (0° electrical), b) 50% counterclockwise position (90° electrical), c) the neutral position (180° electrical), d) 50% clockwise position (270° electrical), e) maximum clockwise position (360° electrical);

FIG. 14 Combined torque and angle sensor in a steering wheel application;

FIG. 15 Combined torque and angle sensor with two combined sensors—an inductive torque sensor and an inductive steering angle 360° single-turn sensor;

FIG. 16 a) combination of two steering angle 360° single-turn sensors for measuring a multi-turn of the first target wheel, b) angle output according to the steering angle over four turns of the first target wheel;

FIG. 17 Schematical overview of a combined inductive torque and angle sensor with a torque sensor, a steering angle 360° single-turn sensor and a multi-turn vernier sensor, whereas the multi-turn vernier sensor wheel is drivable connected to the primary target wheel;

FIG. 18 Schematical perspective view of the combined inductive torque and angle sensor with a torque sensor, a steering angle 360° single-turn sensor and a multi-turn vernier sensor of FIG. 17 and the relation of the individual components to each other;

FIG. 19 Schematical overview of a combined inductive torque and angle sensor with a torque sensor, a steering angle 360° single-turn sensor and a multi-turn vernier sensor, whereas the multi-turn vernier sensor wheel is drivable connected to the secondary target wheel;

FIG. 20 Schematical perspective view of the combined inductive torque and angle sensor with a torque sensor, a steering angle 360° single-turn sensor and a multi-turn vernier sensor of FIG. 19 and the relation of the individual components to each other;

FIG. 21 Overview of the results of sensor plausibility check according to the sensors that are used for it.

FIG. 3 shows a torque sensor design 11 with a printed circuit board 3 and a primary 12 and a secondary target 13, with different position relative to the PCB 3. It is shown that the primary target 12 is moving and placed on one side of the PCB 3, whereas the secondary target 13 is moving and stacked onto the primary target 12, so that the primary target 12 is in-between the PCB 3 and the secondary target 13, or the secondary target 13 is located on the opposite side of the PCB 3 as the primary target 12. While an angle sensor provides an output signal that is proportional to the rotation angle, a torque sensor must NOT provide any change in signal output when it is rotated with no torque. Instead, a torque sensor provides a signal that it proportional to the RELATIVE position of a secondary target 13 relative to a primary target 12, independent of the primary target's angular position. In the embodiment of the proposed invention, the signal proportional to the relative position is achieved by shading more or less area of the secondary coils. The increasing and decreasing shading effect is caused by two targets 12, 13 or 16, 17 having different metallic patterns, placed above or below the coils. The total torque movement range is defined by the combined line & space width of the overlapping targets 12 and 13 and the corresponding primary and secondary metallic patterns 21, 22 (not shown in FIG. 3).

FIG. 4 shows a cross-section of the inventive torque sensor 15 attached to a torsion beam 18. Typical torque sensor applications measure torque as a rotational movement where the twist of a torsion beam 18 is measured. Both ends 19, 20 of the torsion beam 18 are brought together onto a single plane and their relative position to each other is measured.

FIG. 5 shows a schematical representation of a linear torque sensor design for easier understanding. FIG. 5a shows a transmitting 2 and a receiving coil 4, 5, respectively. The transmitting coil Tx 2 generates a magnetic field over the receiving coil Rx 4, 5. The Rx coil 4, 5 is split into a positive and negative loop. Both areas have the same size (Rx+=Rx−). FIG. 5b shows the metallic pattern 21 of a primary target 12. The shaded area is of metal, for example aluminum or copper. FIG. 5c shows the metallic pattern 22 of secondary target 13, whereas the secondary target 13 is moving relative to the primary target 12. In FIG. 5d the secondary target 13 is at max left displacement relative to primary target 12. The Rx+ area is exposed to 50%, Rx− area is fully covered (exposure=0%). Therefore, the output voltage is positive. In FIG. 5e the secondary target 13 is at neutral position relative to the primary target 12. Therefore, both areas are exposed to 25%, and hence the output voltage is 0V. FIG. 5f shows the secondary target 13 at maximal right displacement relative to the primary target 12. Rx− area is exposed to 50%, Rx+ area is fully covered, so the exposure is 0%. Hence, the output voltage is negative.

FIG. 6 shows a schematical representation of a ratiometric linear torque sensor design for easier understanding. In order to provide improved stability towards airgap variations between target and coils, a ratiometric approach is preferred. In this design (FIG. 6a) a transmitting coil 2 is wound in an eight-shape generating two opposite fields in the areas for $Rx_{sin}$ and $Rx_{cos}$ respectively. The transmitting coil can also enclose the entire Rx area as, like a zero-shape (as in FIG. 5). Two receiving coils Rx 4, 5 are located in these areas, having an equally shaped coil design, hence wound in an eight-shape, whereas both coils 4, 5 are split into a positive and negative loop ($Rx_{sin}$−/+ and $Rx_{cos}$−/+). All four areas have the same area ($Rx_{sin}$+=$Rx_{sin}$−=$Rx_{cos}$+=$Rx_{cos}$−). FIG. 6b shows the metallic pattern 21 of the primary target 12 and FIG. 6c shows the metallic pattern 23 of the secondary target 13. The shaded area is of metal, for example aluminum or copper. The secondary target 13 moves relative to the primary target 12. It consists of two checkerboard-like patterns 23 (rows 1-2 and rows 3-4). Rows 3-4 are displaced ½ of the target width (90 electrical degrees) from rows 1-2. This shift of the metallic pattern 23 of the secondary target 13 results in the Rx cos signal being shifted by 90 electrical degrees from the Rx sin signal. This approach allows for a wider movement range, as the full phase of 360 electrical degrees can be utilized.

FIG. 7 shows the ratiometric linear torque sensor design for easier understanding, whereas the primary target 12 is stationary, while the secondary target 13 moves from left to right, exposing more or less area of the four secondary areas $Rx_{sin}$+, $Rx_{sin}$−, $Rx_{cos}$+, $Rx_{cos}$−. The more area is exposed, the higher is the output voltage of the respective coil. If the exposed $Rx_{sin}$+ area is larger than the exposed $Rx_{sin}$− area, the Rx output voltage is in phase with the Tx signal, which is considered as a positive output. At the opposite, if the exposed $Rx_{sin}$− area is larger than the exposed $Rx_{sin}$+ area, the Rx output voltage is out of phase with the Tx signal, which is considered as a negative output. Likewise, the same applies to the $Rx_{cos}$ output. FIG. 7e shows the analysis results according to the detected output voltages of $Rx_{sin}$ and $Rx_{cos}$ and its relation to each other.

FIG. 8 gives an overview of the calculation formulas of the torque sensor values at different positions to calculate the ratiometric torque relatively.

FIG. 9 shows a sinusoidal shaped metallic pattern 24 of the secondary target 13 for generating a sinusoidal response. By changing the rectangular shape of a part 230 of the metallic pattern of the secondary target 13 to a sinusoidal shape part 240 as shown in FIGS. 9a to 9d, the output response versus torque ($V_{sin}$, $V_{cos}$) becomes also sinusoidal (FIG. 9e), which allows the use of an arctangent algorithm (e.g. CORDIC) to calculate the torque: torque=angle=arctan (sin(x)/cos(x)). This is a necessity, if a sensor cannot evaluate triangular signals, e.g. only the CORDIC has been implemented.

FIG. 10 shows a hollow shaft torque sensor coil design, including a corresponding linear design for a better understanding. Based on the simpler linear torque sensor coil design, a hollow shaft rotational torque sensor can be designed by simply transforming the rectangular shape of the linear sensor into a circular shape for the rotational torque sensor, essentially by stretching the linear sensor into a circle such that the left end (0°) and the right end (360°) meet at the starting and end point of the circle. Due to the circular symmetric design of the rotational torque sensor, the end connections of each coil (Tx, $Rx_{sin}$, $Rx_{cos}$) may be located at any angle (in this case $Rx_{cos}$ at the right, $Rx_{sin}$ at the bottom and Tx at the left side of the coil design.

FIG. 11 shows a torque sensor design with a printed circuit board 3 and a primary 16 and a secondary target wheel 17 with a zoomed section of the transmitting coil 2 and receiving coils 4, 5. In another embodiment, the transmitting Tx coil 2 can only comprise of one outer coil with no inner coils or combinations thereof. The receiving Rx coils (in-phase 4 and out-of-phase 5) are electrically connected anti-serially. If both coils 4, 5 are not covered or covered by the same amount, the Rx output is 0V. If Rx-in-phase ($Rx_{sin}+$, $Rx_{cos}+$) and Rx-out-of-phase ($Rx_{cos}+$, $Rx_{cos}-$) are covered by a different amount, the output is < >0V. Each line in the Tx and Rx coils may represent multiple turns. So, the different output voltages of each of the coils are adjusted by changing the area circumferenced by them such that without a target each coil provides the same output voltage. The two receiving torque coils 4, 5 are combined by anti-serial connection, such that the remaining secondary voltage is zero when no target is covering the coils, or when both coils are covered by the same area relative to their circumference. On the primary target wheel 16 the metallic pattern 21 on the primary target 16 for the torque sensor is designed with conductive lines and spaces of equal width such that it covers a total 50% of the circumference for the transmitting torque coil 2. The conductive lines are positioned radial from the center of the primary target wheel 16. On the secondary target wheel 17 the metallic pattern 23 of the secondary target wheel 17 for the torque sensor is designed with conductive lines and spaces of equal width and phase shifted by 180° between the in-phase and out-of-phase receiving torque coils comprising in a checkerboard-like pattern. Also the lines on the secondary target wheel 17 are positioned radial from the center of the secondary target wheel 17 to the outer edge of the target wheel in a ring. It is advantageously, that the mechanical torque range can be adjusted by the width of the checkerboard marks on the torque wheel, id est that the metallic target can be simply changed. It is not necessary to change the electronics, such as coil design or sensor chip settings. So it is easier to adapt the present steering wheel torque range. The small image section in FIG. 11 shows the electrical connection between the transmitting and receiving coils of the torque sensor.

FIG. 12 shows an inventive torque sensor target design. Similarly to the simplified description using a linear pattern in FIGS. 5 to 7 and 9, the rotational torque sensor contains a sun ray like metallic pattern 21 for the primary target wheel 16 and a checkerboard-like metallic pattern 23 on the secondary target wheel 17. As the two target wheels 16, 17 move relative to each other, they expose more or less area of the underlying sine and cosine coil structures. The more area is exposed the higher is the induced voltage in that area. If both primary 16 and secondary wheels 17 rotate while maintaining their relative position, the output voltage remains unchanged. It is only dependent on the relative position, not the absolute position of the two wheels.

FIG. 13 shows a torque sensor with the printed circuit board 3 and the primary 16 and secondary target wheel 17 with the metallic pattern 21, 23 stacked over each other. In FIG. 13a the primary 16 and secondary target wheels 17 with the metallic pattern 21, 23 are in maximum counter-clockwise position (0 electrical degrees). The cosine output voltage is at positive maximum, while the sine voltage is zero. Note that this position is equal to the maximum clockwise position (360 electrical degrees), so the maximum allowed torque must be <360 electrical degrees. In FIG. 13b the primary 16 and secondary target wheels 17 with the metallic pattern 21, 23 are in 50% counterclockwise position (90 electrical degrees), hence the sine output voltage is at positive maximum, while the cosine voltage is zero. In FIG. 13c the primary 16 and secondary target wheels 17 with the metallic pattern 21, 23 are in the neutral position (180 electrical degrees), hence the sine output voltage is zero, while the cosine voltage is at negative maximum. In FIG. 13d the primary 16 and secondary target wheels 17 with the metallic pattern 21, 23 are in 50% clockwise position (270 electrical degrees), hence the sine output voltage is at negative maximum, while the cosine voltage is zero. An in FIG. 13e the primary 16 and secondary target wheels 17 with the metallic pattern 21, 23 are in maximum clockwise position (360 electrical degrees), hence the cosine output voltage is at positive maximum, while the sine voltage is zero. This position is equal to the maximum counterclockwise position (0 electrical degrees), so the maximum allowed torque must be <360 electrical degrees.

FIG. 14 shows a cross-sectional view of the inventive combined torque and angle sensor. The primary target wheel 16, connected to the steering column side 36 of the torsion beam 18 contains the patterns for both steering angle 360° single-turn sensor 29 as well as the metallic patterns 21 for the primary torque sensor. The secondary target wheel 17, connected to the steering wheel side 35 contains the metallic patterns 23 for the secondary torque sensor. Thereby, the secondary target wheel 17 is attached to the input shaft 19 on the steering wheel side 35. The primary target wheel 16 is attached to the output shaft 20 on the column side 36. The PCB 3 does not need to function as a shield, it can be attached to the steering column 37 on the column side 36 and will be hold in a fixed position. Therefore, no rotational electronic parts, such as a clock spring cable are necessary in this combined sensor arrangement. In order to neglect the dependency of airgap between coils and targets, a ratiometric approach is proposed, measuring the ratio of the generated signal from two equal, but 90° phase shifted target pattern arrangements. The two signals provide a triangular response of output voltage vs. relative position.

FIG. 15 shows the combined torque and angle sensor with two combined sensors—an inductive torque sensor 11 and a steering angle 360° single-turn sensor 1. On the PCB 3 the sensing coils of the torque sensor 26 and the steering angle 360° single-turn sensor chips 27 are shown. The sensing coils 2, 4, 5, 28 are centrally located around a torsion beam 18 that is included into a steering column 37 (not shown). In front of the PCB 3 the primary target wheel 16 is situated and also attached to the torsion beam 18 on the output shaft 20 on the column side 36 (not shown). The primary target wheel 16 comprises the metallic pattern 29 for the steering angle 360° single-turn sensor 1 and the first metallic pattern 21 for the torque sensor 11. In front of the primary target wheel 16 the secondary target wheel 17 is positioned, attached to the input shaft 19 on the steering wheel side 35. The secondary target wheel 17 comprises the metallic pattern 23 of the torque sensor 11. The first 21 and second 23 metallic pattern of the torque sensor 11 are shown in FIG. 11 exemplary.

FIG. 16 shows an extension for the combined sensor therein that it is extended by a third target wheel 32, namely a multi-turn vernier cog wheel 32. Steering wheel sensors typically require absolute angle sensor calculation over several turns (e.g. 3 or 4 turns). A simple way to provide multi-turn counting is to detect an angle transition 0°<->360° and to increment/decrement a counter, each time the angle rolls over the 0°/360° transition. In such case, both the sensor as well as the counter must be powered continuously as the multi-turn information is otherwise lost when the power to the sensor IC or counter is removed. While this may be acceptable in some cases, extended safety is provided by keeping the multi-turn information even when power is removed and restored or the sensor rotated while power is off. This can be achieved by means of two sensors, a steering angle 360° single-turn 1 and a multi-turn sensor coupled by a mechanical gear 30. With a proper selection of the gear ratio (e.g. 3:7, 4:7, 4:9), the phase difference of the two sensors is then unique over several turns. In FIG. 16a a multi-turn vernier cog wheel 32 is drivable connected to the primary target wheel 16, with an example of 4:9 gear ratio. On the primary target wheel 16 the pattern 29 of the first steering angle 360° single-turn sensor 1 is located and on the multi-turn vernier cog wheel 32 a second 360° single-turn sensor pattern 31 is located, both provide angle measurement values. This further target wheel 32 is called vernier cog wheel, because the so-called vernier principle allows absolute angle calculation over multiple turns by including both angles values as well as the phase difference of the two. With proper selection of the gear ratio (e.g. 3:7, 4:7, 4:9), the phase difference of the two sensors is then unique over several turns. An example for a 4:7 gear ratio is shown in FIG. 16b (it is not the measurement result of the two wheels in FIG. 16a). The dashed and solid lines represent the angle output of the steering angle 360° single-turn sensor 1 on the primary target wheel 16 making four turns and the second 360° single-turn sensor on the multi-turn vernier cog wheel 32 making seven turns in accordance to the steering angle over four turns.

FIG. 17 shows a schematical overview of a combined inductive torque an angle sensor with a torque sensor 11, a steering angle 360° single-turn sensor 1 and a multi-turn vernier sensor chips 34, whereas the multi-turn vernier sensor wheel 32 is drivable connected to the primary target wheel 16. The inductive steering angle 360° single-turn sensor concept as well as combined single-turn/incremental high resolution angle sensor can be easily extended to a multi-turn sensor using only one gear: the primary target wheel 16 is driving the multi-turn vernier cog wheel 32 with a non-integer gear ratio (e.g. 3:7, 4:7, 3:11, 4:9, 4:11 etc.). The vernier cog wheel 32 position is measured by another 360° single-turn sensor 34, its pattern 31 is on the vernier cog wheel 32 and the corresponding sensing coil 33 on the PCB 3. By combining the angle information of both single-turn sensors (#2) and multi-turn vernier sensor 34 (#3), a unique absolute steering angle can be calculated over several turns of the primary wheel 16. So, on the PCB 3 the sensing coils 2, 4, 5, 28 of the torque sensor chip 14, the steering angle 360° single-turn sensor chip 27 and the second 360° single-turn sensor 34 (the multi-turn vernier sensor) are shown. The sensing coils 2, 4, 5, 28 are centrally located around a torsion beam 18 that is included into a steering column 37 (not shown), but not the sensing coil 33 for the multi-turn vernier sensor, because this is located in such a way that the sensing coil 33 are superimposed by the pattern 31 on the multi-turn vernier cog wheel 32. In front of the PCB 3 the primary target wheel 16 is situated and also attached to the torsion beam 18 on the output shaft 20 on the column side 36 (not shown). The primary target wheel 16 comprises the pattern 29 for the steering angle 360° single-turn sensor 1 and the first pattern 21 for the torque sensor. The multi-turn vernier cog wheel 32 is drivable connected to the primary target wheel 16. In front of the primary target wheel 16 the secondary target wheel 17 is positioned, attached to the input shaft 19 on the steering wheel side 35. The secondary target wheel 17 comprises the second pattern 23 of the torque sensor 11. The first 21 and second patterns 23 of the torque sensor 11 are shown in FIG. 3. The patterns on the primary 16 and secondary 17 target wheel correspond to the sensing coils 2, 4, 5 on the PCB 3, id est the particular patterns cover the respective sensing coil on the PCB 3. The primary target wheel 16 and multi-turn cog wheel 32 are formed as a gearing mechanism 30. Therewith, the gear ratio n:m of non-integer can be adjusted, whereas m is the number of primary wheel turns. For three turns the gear ratio should be m/n=e.g. 3:7 or 3:11.

FIG. 18 shows a schematical perspective view of the combined inductive torque and angle sensor with a torque sensor, a steering angle 360° single-turn sensor and a multi-turn vernier sensor of FIG. 17 and the relation of the individual components to each other. The components are stringed on a torsion beam 18, whereas the primary target wheel 16 is located on the steering column side 36 and the secondary target wheel 17 is located on the steering wheel side 35. The first steering angle 360° single-turn sensor and torque sensor wheel are attached to the steering column 37 leading to the rack/& pinion assembly. The torsion beam 18 is twisted by the force on the steering wheel 25. The secondary target wheel 17 including the metallic pattern 23 for the torque sensor, mounted to the opposite end of the torsion beam 18 and placed on top of the primary target wheel 16, leading to the steering wheel 25. A second 360° single-turn sensor 34 measures the angle of the vernier cog wheel 32, which is driven by primary target wheel 16 by means of a vernier multi-turn angle sensor 34. Since wheels 16 and 31 are in a fixed relation (e.g. 3:7, 4:7) a plausibility check can be made on these two sensors as any angle position on 16 can have only 3 or 4 possible angle positions on 31 for a 1080° resp. 1440° angle range. For a plausibility check of the torque sensor (A) relative to 17, a second, redundant torque sensor IC would be required in this case.

FIG. 19 shows a schematical overview of a combined inductive torque and angle sensor with a torque sensor, a steering angle 360° single-turn sensor and a multi-turn vernier sensor, whereas the multi-turn vernier sensor wheel 32 is drivable connected to the secondary target wheel 17. Alternatively to mechanically link the multi-turn vernier cog wheel 32 to the primary torque/steering target wheel 16, the multi-turn vernier target wheel 32 may also be mechanically linked to the secondary torque target wheel 17. In this case, there is no longer a direct link of the steering angle 360° single-turn sensor 1 and the multi-turn vernier sensor. Rather, the link between the two target wheels includes the torque. This way a plausibility check of the torque is possible with only three sensors (torque sensor, a steering angle 360° single-turn sensor on primary target wheel and multi-turn vernier sensor. So, on the PCB 3 the sensing coils of the torque sensor, the steering angle 360° single-turn sensor and the second 360° single-turn sensor 34 (the multi-turn vernier sensor) are shown. The sensing coils are centrally located around a torsion beam 18 (not shown) that is included into a steering column 37 (not shown), but not the sensing coil 33 for the multi-turn vernier sensor, because this is located in such a way that the sensing coil 33 is superimposed by the pattern on the multi-turn vernier cog wheel 32. In front of the PCB 3 the primary target wheel 16 is situated and also attached to the torsion beam 18 on the output shaft 20 on the column side 36 (not shown). The primary target wheel 16 comprises the metallic pattern 29 for the steering angle 360° single-turn sensor 1 and the first metallic pattern for the torque sensor 21. In front of the primary target wheel 16 the secondary target wheel 17 is positioned, attached to the input shaft 19 on the steering wheel side 35. The secondary target wheel 17 comprises the second metallic pattern 23 of the torque sensor. The metallic pattern 23 of the torque sensor on the primary 16 and secondary 17 target is shown in FIG. 6 or 11. The metallic pattern 21, 23 on the primary 16 and secondary 17 target wheel corresponds to the sensing coils 2, 4, 5 on the PCB 3, id est the particular pattern cover the respective sensing coil on the PCB 3. The secondary target 17 and multi-turn cog wheel 32 are formed as a gearing mechanism. Therewith, the gear ratio n:m of non-integer can be adjusted, whereas m is the number of primary wheel turns. For three turns the gear ratio should be m/n=e.g. 3:7 or 3:11.

FIG. 20 shows a schematical perspective view of the combined inductive torque and angle sensor with a torque sensor, a steering angle 360° single-turn sensor and a multi-turn vernier sensor of FIG. 19 and the relation of the individual components to each other. The components are stringed on a torsion beam 18, whereas the primary target wheel 16 is located on the steering column side 36 and the secondary target wheel 17 is located on the steering wheel side 35. The primary steering angle 360° single-turn sensor and torque sensor wheel (A) are attached to the steering column leading to the rack/& pinion assembly. The torsion beam 18 is twisted by the force on the steering wheel 25. The secondary target wheel 17 (B) including the second pattern 23 for the torque sensor, mounted to the opposite end of the torsion beam 18 and placed on top of the primary target wheel 16 (A), leading to the steering wheel 25. A second 360° single-turn sensor 34 measuring the angle of the vernier cog wheel 32 (C), which is driven by secondary target wheel 17 (B) by means of a vernier multi-turn angle sensor. Since wheels (A) and (C) are not linked directly but through the torsion beam 18, the phase difference between wheels (A) and (C) includes the torque angle. A plausibility check can now be made for the torque sensor by adding the torque angle from the torque sensor to the angle information of (A) to calculate the expected position of wheel (C). Any angle position of ((A)+torque) can have only 3 or 4 positions on (C) for an 1080° resp. 1440° angle range.

FIG. 21 shows the results of a sensor plausibility check according to the number of sensors and the sensors that are used for it. As FIG. 21 shows, a plausibility check of all sensors (combined) is already possible with only 3 sensors. Adding up to 6 sensors in total, a double plausibility check is possible for each angle information (steering angle, torque, multi-turn). Even further safety may be added by implementing a turns counter in sensors (A) and (C). In FIG. 21 the sensor numbers are connected to the following sensors:

Sensor 1: Steering column single-turn sensor (A)
Sensor 2: torque sensor (B)
Sensor 3a: Vernier multi-turn sensor (C) driven by (A)
Sensor 3b: Vernier multi-turn sensor (C) driven by (B)
Sensor 4: Steering column single-turn redundant sensor (A)
Sensor 5: torque redundant sensor (B)
Sensor 6: Vernier multi-turn redundant sensor (C)

LIST OF REFERENCE SIGNS 1 steering angle 360° single-turn sensor
2 transmitting coil Tx
3 printed circuit board (PCB)
4 receiving coil $Rx_{sin}$
5 receiving coil $Rx_{cos}$
6 half-circle metallic target
7 incremental high resolution angle sensor
8 target ring
9 segment
10 non-metallic part of a segment
109 metallic part of a segment
11 torque sensor
12 primary target
13 secondary target
14 sensor integrated circuit (IC)
15 torque sensor on a rotating shaft
16 primary target wheel
17 secondary target wheel
18 torsion beam
19 input shaft
20 output shaft
21 metallic pattern of the primary target
22 metallic pattern of the secondary target, checkerboard-like row 1 and 2
220 part of the pattern of 22
23 metallic pattern of the secondary target, checkerboard-like two groups of two rows 1,2 and 3,4
230 part of the pattern of 23
24 metallic pattern of the secondary target, sinusoidal-like-two groups of two rows 1,2 and 3,4
240 part of pattern 24
25 steering wheel
26 inductive torque sensor chip
27 steering angle 360° single-turn sensor chip
28 steering angle 360° single-turn sensor coils
29 metallic pattern for single-turn angle sensor
30 gear mechanism
31 metallic pattern on the multi-turn vernier cog wheel for a second 360° single-turn sensor
32 multi-turn vernier cog wheel
33 sensing multi-turn angle sensor coil
34 second 360° single-turn sensor chip
35 steering wheel side
36 steering column side
37 steering column

The invention claimed is:

1. An inductive torque sensor for detection of relative displacement movements comprising a stationary printed circuit board (PCB) with sensing coils, a primary target and a secondary target, whereas the primary target and secondary target each comprise of different metallic patterns, whereas the PCB, the primary and secondary target are stacked over each other and the primary and secondary target are placed either above and/or below the sensing coils, wherein a relative displacement movement detection range is defined by a line width and a space width of the metallic pattern of the primary target and secondary target if the secondary target is moved relative to the primary target, whereas each target covers 50% of the sensing coils and a combined coverage of both targets varies between 50% and 100% depending on a relative position between the primary and secondary targets,
  wherein the metallic pattern of the secondary target is arranged in a checkerboard-like pattern of two rows,
  wherein the metallic pattern of the secondary target comprises two groups of the checkerboard-like pattern of two rows, whereas the two groups are displaced a half pitch of the line width to each other.

2. The inductive torque sensor according to claim 1, wherein the sensing coils on the PCB comprise a transmitting coil Tx and a receiving coil Rx, whereas the receiving coil is split into a positive and a negative loop area (Rx+, Rx-), and the transmitting coil Tx surrounds the receiving coil on an outer edge.

3. The inductive torque sensor according to claim 1, wherein the sensing coils comprise two equally shaped receiving coils, each split into a positive and negative loop area (Rxsin-/+ and Rxcos-/+), whereas Tx surrounds the two receiving coils on their outer edge, respectively.

4. The inductive torque sensor according to claim 3 wherein the receiving coils are electrically connected anti-serial.

5. The inductive torque sensor according to claim 1, wherein the metallic pattern of the primary target is strip-shaped.

6. The inductive torque sensor according to claim 1, wherein a metallic part of the checkerboard-like pattern has a rectangular shape providing a triangular output response of the torque sensor or a metallic part of the checkerboard-like pattern has a sinusoidal shape providing a sinusoidal output response of the torque sensor.

7. The inductive torque sensor according to claim 1, wherein the inductive torque sensor is rotational symmetric with a circular shape of the sensing coils, the primary and secondary target.

8. A combined inductive torque and angle sensor for position sensing, comprising a stationary printed circuit board with a sensor integrated circuit and sensing coils, a primary target wheel, a secondary target wheel and a torsion beam with a steering column side and a steering wheel side, whereas the primary target wheel is centrally stacked on the torsion beam on the steering column side and comprises a metallic pattern for a steering angle 360° single-turn sensor and a first metallic pattern for the torque and angle sensor, and the secondary target wheel is centrally stacked on the torsion beam on the steering wheel side comprising a second metallic pattern of the torque and angle sensor, wherein the secondary target wheel is rotational symmetric and the metallic pattern of the secondary target wheel for the torque and angle sensor is designed in two groups of a checkerboard-like pattern of two rows, whereas the two groups are displaced a half pitch of a line width to each other.

9. The combined inductive torque and angle sensor for position sensing according to claim 8, wherein the printed circuit board comprises a sensing angle coil for the steering angle 360° single-turn sensor and sensing torque coils for the torque and angle sensor, wherein the sensing torque coils on the printed circuit board comprise a transmitting coil Tx and a receiving coil Rx, whereas the receiving coil is split into a positive and a negative loop area (Rx+, Rx-), and the transmitting coil Tx surrounds the receiving coil on an outer edge.

10. The combined inductive torque and angle sensor for position sensing according to claim 9, wherein the primary target wheel is rotational symmetric and the metallic pattern for the steering angle 360° single-turn sensor is a half-circle conductive line along a circumference of the primary target wheel and the metallic pattern of the primary target wheel for the torque and angle sensor is designed radial with conductive lines and spaces of equal width such that it covers a total 50% of the transmitting coil and receiving coils on the printed circuit board (PCB).

11. The combined inductive torque and angle sensor for position sensing according to claim 8, wherein the combined inductive torque and angle sensor comprises a multi-turn vernier cog wheel that is drivable connected to the primary target wheel or the secondary target wheel.

12. The combined inductive torque and angle sensor for position sensing according to claim 11, wherein the multi-turn vernier cog wheel and the primary or secondary target wheel form a gearing mechanism with a gear ratio n:m of non-integer, whereas n is a number of primary wheel turns that need to be uniquely detected and m is a number of turns on the multi-turn vernier cog wheel.

13. The combined inductive torque and angle sensor for position sensing according to claim 8, wherein the PCB comprises a multi-turn vernier sensor, a sensing multi-turn vernier coil and means for calculating a unique absolute angle over several turns of the primary target wheel.

14. The combined inductive torque and angle sensor for position sensing according to claim 8, wherein the PCB comprises a multi-turn vernier sensor and a sensing multi-turn vernier coil for performing a plausibility check of torque, whereas the plausibility check is performable with only three sensors, one single-turn angle sensor, one torque sensor and one multi-turn vernier sensor, respectively.

\* \* \* \* \*